(12) United States Patent
Seiders et al.

(10) Patent No.: US 10,577,167 B2
(45) Date of Patent: Mar. 3, 2020

(54) INSULATING CONTAINER

(71) Applicant: YETI Coolers, LLC, Austin, TX (US)

(72) Inventors: Roy Joseph Seiders, Austin, TX (US); Christopher M. Keller, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 13 days.

(21) Appl. No.: 16/153,011

(22) Filed: Oct. 5, 2018

(65) Prior Publication Data
US 2019/0039808 A1 Feb. 7, 2019

Related U.S. Application Data

(60) Continuation of application No. 15/790,926, filed on Oct. 23, 2017, now Pat. No. 10,442,599, which is a
(Continued)

(51) Int. Cl.
*B65B 7/00* (2006.01)
*A41B 13/04* (2006.01)
(Continued)

(52) U.S. Cl.
CPC ............. *B65D 81/389* (2013.01); *A45C 3/00* (2013.01); *A45C 3/001* (2013.01); *A45C 11/20* (2013.01);
(Continued)

(58) Field of Classification Search
CPC ......... B29C 65/02; B29C 65/18; B29C 65/56; B29C 65/562; B29C 65/72; B29C 59/00;
(Continued)

(56) References Cited

U.S. PATENT DOCUMENTS 210,994 A 12/1878 Carnagy
1,587,655 A 6/1926 Kidwell
(Continued)

FOREIGN PATENT DOCUMENTS

BE 1015808 A6 9/2005
CA 2243820 A1 1/2000
(Continued)

OTHER PUBLICATIONS

Jul. 3, 2019—(CN) First Office Actiont—App. No. 201780042659.5.
(Continued)

*Primary Examiner* — Philip C Tucker
*Assistant Examiner* — Brian R Slawski
(74) *Attorney, Agent, or Firm* — Banner & Witcoff, Ltd.

(57) ABSTRACT

An insulating device can include an aperture having a waterproof closure which allows access to the chamber within the insulating device. The closure can help prevent any fluid leakage into and out of the insulating device if the insulating device is overturned or in any configuration other than upright. The closure also prevents any fluid from permeating into the chamber if the insulating device is exposed to precipitation, other fluid, or submersed under water. This construction results in an insulating chamber impervious to water and other liquids when the closure is sealed.

18 Claims, 17 Drawing Sheets

Related U.S. Application Data continuation of application No. 14/831,641, filed on Aug. 20, 2015, now Pat. No. 9,796,517, which is a division of application No. 14/479,607, filed on Sep. 8, 2014, now Pat. No. 9,139,352.

(60) Provisional application No. 61/937,310, filed on Feb. 7, 2014.

(51) Int. Cl.

| | | |
|---|---|---|
| B32B 3/00 | (2006.01) | |
| B65B 11/00 | (2006.01) | |
| B32B 33/00 | (2006.01) | |
| B29C 53/00 | (2006.01) | |
| B29C 65/00 | (2006.01) | |
| B32B 37/00 | (2006.01) | |
| C08J 5/00 | (2006.01) | |
| A47J 39/00 | (2006.01) | |
| A47J 41/00 | (2006.01) | |
| B65D 81/38 | (2006.01) | |
| B65D 25/28 | (2006.01) | |
| B65D 45/16 | (2006.01) | |
| A45C 13/10 | (2006.01) | |
| B29C 65/56 | (2006.01) | |
| B29C 65/72 | (2006.01) | |
| B29C 59/02 | (2006.01) | |
| A45C 3/00 | (2006.01) | |
| B65D 25/18 | (2006.01) | |
| A45C 11/20 | (2006.01) | |
| A45C 13/00 | (2006.01) | |
| A45C 13/26 | (2006.01) | |
| A45C 13/30 | (2006.01) | |
| B65D 25/20 | (2006.01) | |
| F25D 3/08 | (2006.01) | |
| B32B 37/18 | (2006.01) | |
| B29C 65/02 | (2006.01) | |
| B32B 37/14 | (2006.01) | |

(52) U.S. Cl.
CPC .......... *A45C 13/008* (2013.01); *A45C 13/103* (2013.01); *A45C 13/26* (2013.01); *A45C 13/30* (2013.01); *B65D 25/18* (2013.01); *B65D 25/205* (2013.01); *B65D 81/3858* (2013.01); *B29C 59/02* (2013.01); *B29C 65/02* (2013.01); *B29C 65/562* (2013.01); *B29C 65/72* (2013.01); *B29C 66/43* (2013.01); *B29C 66/4322* (2013.01); *B29C 66/4326* (2013.01); *B32B 37/142* (2013.01); *B32B 37/185* (2013.01); *B65D 25/2873* (2013.01); *F25D 3/08* (2013.01); *F25D 2331/801* (2013.01); *Y10T 29/49826* (2015.01); *Y10T 29/49828* (2015.01)

(58) Field of Classification Search
CPC ..... B29C 59/02; B29C 66/43; B29C 66/1122; B29C 66/432; B29C 66/4322; B29C 66/4326; B32B 37/142; B32B 37/16; B32B 37/18; B32B 37/182; B32B 37/185; A45C 11/20; A45C 13/008; A45C 13/02; A45C 13/026; A45C 13/30; A45C 13/10; A45C 2013/026; A45C 2013/303; A45C 3/00; A45C 3/001; A45C 7/0077; F25D 3/08; F25D 2331/801; F25D 2331/804; B65D 81/3897; B65D 81/3848; B65D 81/3851; B65D 81/3858; B65D 81/3888; B65D 25/28; B65D 25/2867; B65D 25/2873; B65D 39/00; B65D 66/432; B65D 66/4322; B65D 66/4326
USPC .... 156/60, 69, 70, 80, 90, 91, 92, 196, 212, 156/213, 215, 217, 218, 221, 226, 227, 156/242, 245, 292, 293, 294, 303.1, 156/308.2, 308.4, 309.6; D7/605, 607, D7/608; 220/592.2, 592.25; 62/530, 62/457.8; D3/273, 276, 289; 206/545, 206/549; 383/7, 13, 15, 16, 17, 20, 42, 383/68, 78, 97, 110, 121.1
See application file for complete search history.

(56) References Cited

U.S. PATENT DOCUMENTS

| | | |
|---|---|---|
| 1,949,677 A | 3/1934 | Crawford |
| 2,119,621 A | 6/1938 | Ferrone |
| 2,253,598 A | 8/1941 | Africa |
| 2,289,254 A | 7/1942 | Eagles |
| 2,522,381 A | 9/1950 | Kramer |
| 2,575,191 A | 11/1951 | Seipp |
| 2,575,893 A | 11/1951 | Seaman |
| 2,633,223 A | 3/1953 | Zeamer |
| 2,651,485 A | 9/1953 | Schutz |
| 2,661,785 A | 12/1953 | Daust |
| 2,685,385 A | 8/1954 | Kuss |
| 2,808,093 A | 10/1957 | Gilman |
| 2,954,891 A | 10/1960 | Imber |
| 2,960,136 A | 11/1960 | Ziff |
| 3,066,846 A | 12/1962 | Domigan |
| 3,454,197 A | 7/1969 | Thompson |
| 3,801,425 A | 4/1974 | Cook |
| 3,814,288 A | 6/1974 | Westrich |
| 3,834,044 A | 9/1974 | McAusland et al. |
| 3,905,511 A | 9/1975 | Groendal |
| 4,125,212 A | 11/1978 | Courchesne |
| 4,127,155 A | 11/1978 | Hydom |
| 4,143,695 A | 3/1979 | Hoehn |
| 4,194,627 A | 3/1980 | Christensen |
| 4,196,817 A | 4/1980 | Moser |
| 4,197,890 A | 4/1980 | Simko |
| 4,210,186 A | 7/1980 | Belenson |
| 4,211,091 A | 7/1980 | Campbell |
| 4,211,267 A | 7/1980 | Skovgaard |
| 4,248,366 A | 2/1981 | Christiansen |
| D265,948 S | 8/1982 | Stark |
| 4,344,303 A | 8/1982 | Kelly, Jr. |
| 4,372,453 A | 2/1983 | Branscum |
| 4,375,828 A | 3/1983 | Biddison |
| D268,879 S | 5/1983 | Outcalt |
| 4,399,668 A | 8/1983 | Williamson |
| 4,468,933 A | 9/1984 | Christopher |
| 4,513,895 A | 4/1985 | Leslie |
| 4,521,910 A | 6/1985 | Keppel et al. |
| 4,537,313 A | 8/1985 | Workman |
| 4,541,540 A | 9/1985 | Gretz et al. |
| D281,122 S | 10/1985 | Bomes et al. |
| D281,546 S | 12/1985 | Bradshaw |
| D281,646 S | 12/1985 | Bomes et al. |
| D282,602 S | 2/1986 | Allen |
| 4,571,338 A | 2/1986 | Okonogi et al. |
| 4,595,101 A | 6/1986 | Rivera |
| 4,596,370 A | 6/1986 | Adkins |
| D284,620 S | 7/1986 | Calton |
| 4,598,746 A | 7/1986 | Rabinowitz |
| 4,637,063 A | 1/1987 | Sullivan et al. |
| D289,128 S | 4/1987 | Bradshaw |
| 4,673,117 A | 6/1987 | Calton |
| 4,679,242 A | 7/1987 | Brockhaus |
| 4,708,254 A | 11/1987 | Byrns |
| 4,746,028 A | 5/1988 | Bagg |
| 4,759,077 A | 7/1988 | Leslie |
| 4,765,476 A | 8/1988 | Lee |
| 4,796,937 A | 1/1989 | Andrea |

(56) References Cited

U.S. PATENT DOCUMENTS

| | | |
|---|---|---|
| 4,802,344 A | 2/1989 | Livingston et al. |
| 4,802,602 A | 2/1989 | Evans et al. |
| 4,805,776 A | 2/1989 | Namgyal et al. |
| 4,812,054 A | 3/1989 | Kirkendall |
| 4,826,060 A | 5/1989 | Hollingsworth |
| 4,858,444 A | 8/1989 | Scott |
| 4,867,214 A | 9/1989 | Fuller |
| 4,871,069 A | 10/1989 | Guimont |
| 4,886,183 A | 12/1989 | Fleming |
| 4,941,603 A | 7/1990 | Creamer et al. |
| 4,984,906 A | 1/1991 | Little |
| 4,986,089 A | 1/1991 | Raab |
| 4,989,418 A | 2/1991 | Hewlett |
| 5,004,091 A | 4/1991 | Natho et al. |
| 5,005,679 A | 4/1991 | Hjelle |
| 5,042,664 A | 8/1991 | Shyr et al. |
| 5,048,734 A | 9/1991 | Long |
| 5,062,557 A | 11/1991 | Mahvi et al. |
| 5,190,376 A | 3/1993 | Book |
| 5,216,900 A | 6/1993 | Jones |
| 5,221,016 A | 6/1993 | Karpal |
| 5,237,838 A | 8/1993 | Merritt-Munson |
| 5,244,136 A | 9/1993 | Collaso |
| D339,979 S | 10/1993 | Wehrley |
| D340,387 S | 10/1993 | Melk |
| D340,621 S | 10/1993 | Melk |
| D340,840 S | 11/1993 | Melk |
| 5,269,368 A | 12/1993 | Schneider et al. |
| D343,992 S | 2/1994 | Melk |
| 5,297,870 A | 3/1994 | Weldon |
| 5,313,807 A | 5/1994 | Owen |
| 5,325,991 A | 7/1994 | Williams |
| 5,354,131 A | 10/1994 | Mogil |
| 5,355,684 A | 10/1994 | Guice |
| 5,398,848 A | 3/1995 | Padamsee |
| 5,400,610 A | 3/1995 | Macedo |
| 5,403,095 A | 4/1995 | Melk |
| 5,421,172 A | 6/1995 | Jones |
| 5,447,764 A | 9/1995 | Langford |
| 5,472,279 A | 12/1995 | Lin |
| 5,490,396 A | 2/1996 | Morris |
| 5,509,279 A | 4/1996 | Brown et al. |
| D370,599 S | 6/1996 | Christopher et al. |
| D371,052 S | 6/1996 | Melk |
| 5,529,217 A | 6/1996 | Siegel |
| D373,515 S | 9/1996 | Melk |
| 5,553,759 A | 9/1996 | McMaster et al. |
| 5,562,228 A | 10/1996 | Ericson |
| 5,564,568 A | 10/1996 | Rankin, Sr. |
| 5,569,401 A | 10/1996 | Gilliland et al. |
| 5,595,320 A | 1/1997 | Aghassipour |
| D382,771 S | 8/1997 | Mogil |
| D383,360 S | 9/1997 | Melk |
| 5,680,944 A | 10/1997 | Rueter |
| 5,680,958 A | 10/1997 | Mann et al. |
| D386,310 S | 11/1997 | Smith |
| 5,687,874 A | 11/1997 | Omori et al. |
| D387,249 S | 12/1997 | Mogil |
| 5,706,969 A | 1/1998 | Yamada et al. |
| 5,732,867 A | 3/1998 | Perkins et al. |
| D394,553 S | 5/1998 | Lin |
| D395,555 S | 6/1998 | Ursitti |
| 5,758,513 A | 6/1998 | Smith |
| 5,779,089 A | 7/1998 | West |
| D397,273 S | 8/1998 | Collie |
| 5,816,709 A | 10/1998 | Demus |
| D401,063 S | 11/1998 | Yamamoto et al. |
| 5,842,571 A | 12/1998 | Rausch |
| 5,845,514 A | 12/1998 | Clarke et al. |
| 5,848,734 A | 12/1998 | Melk |
| 5,857,778 A | 1/1999 | Elis |
| D409,376 S | 5/1999 | Golenz et al. |
| 5,909,821 A | 6/1999 | Guridi |
| 5,913,448 A | 6/1999 | Mann et al. |
| 5,915,580 A | 6/1999 | Melk |
| 5,931,583 A | 8/1999 | Collie |
| D414,379 S | 9/1999 | Haberkorn |
| 5,954,253 A | 9/1999 | Swetish |
| 5,988,468 A | 11/1999 | Murdoch et al. |
| 5,988,879 A | 11/1999 | Bredderman et al. |
| 6,019,245 A | 2/2000 | Foster et al. |
| 6,027,249 A | 2/2000 | Bielinski |
| 6,029,847 A | 2/2000 | Mahoney, Jr. et al. |
| 6,048,099 A | 4/2000 | Muffett et al. |
| D424,417 S | 5/2000 | Axelsson |
| 6,059,140 A | 5/2000 | Hicks |
| 6,065,873 A | 5/2000 | Fowler |
| 6,068,402 A | 5/2000 | Freese et al. |
| 6,073,796 A | 6/2000 | Mogil |
| 6,082,589 A | 7/2000 | Ash et al. |
| 6,082,896 A | 7/2000 | Pulli |
| 6,089,038 A | 7/2000 | Tattam |
| 6,092,266 A | 7/2000 | Lee |
| 6,092,661 A | 7/2000 | Mogil |
| 6,116,045 A | 9/2000 | Hodosh et al. |
| 6,128,915 A | 10/2000 | Wagner |
| 6,129,254 A | 10/2000 | Yu |
| 6,139,188 A | 10/2000 | Marzano |
| 6,145,715 A | 11/2000 | Slonim |
| 6,149,305 A | 11/2000 | Fier |
| D437,110 S | 2/2001 | Ivarson et al. |
| 6,193,034 B1 | 2/2001 | Fournier |
| 6,209,343 B1 | 4/2001 | Owen |
| 6,220,473 B1 | 4/2001 | Lehman et al. |
| 6,234,677 B1 | 5/2001 | Mogil |
| 6,237,776 B1 | 5/2001 | Mogil |
| 6,247,328 B1 | 6/2001 | Mogil |
| 6,253,570 B1 | 7/2001 | Lustig |
| 6,276,579 B1 | 8/2001 | DeLoach |
| D447,632 S | 9/2001 | Gisser |
| D447,667 S | 9/2001 | Schneider et al. |
| 6,286,709 B1 | 9/2001 | Hudson |
| 6,296,134 B1 | 10/2001 | Cardinale |
| 6,296,165 B1 | 10/2001 | Mears |
| 6,298,993 B1 | 10/2001 | Kalozdi |
| 6,336,342 B1 * | 1/2002 | Zeddies ............ B65D 81/3858 220/592.26 |
| 6,336,577 B1 | 1/2002 | Harris et al. |
| 6,353,215 B1 | 3/2002 | Revels et al. |
| D455,934 S | 4/2002 | Culp et al. |
| 6,363,739 B1 | 4/2002 | Hodosh et al. |
| D457,307 S | 5/2002 | Pukall et al. |
| 6,409,066 B1 | 6/2002 | Schneider et al. |
| 6,422,032 B1 | 7/2002 | Greene |
| 6,439,389 B1 | 8/2002 | Mogil |
| D464,235 S | 10/2002 | Jeong |
| D465,134 S | 11/2002 | Joss |
| 6,481,239 B2 | 11/2002 | Hodosh et al. |
| D466,291 S | 12/2002 | Ng |
| 6,495,194 B2 | 12/2002 | Sato et al. |
| 6,505,479 B2 | 1/2003 | Defelice et al. |
| 6,511,695 B1 | 1/2003 | Paquin et al. |
| 6,513,661 B1 | 2/2003 | Mogil |
| D472,431 S | 4/2003 | Spence, Jr. |
| 6,554,155 B1 | 4/2003 | Beggins |
| D474,649 S | 5/2003 | Spence, Jr. |
| 6,582,124 B2 | 6/2003 | Mogil |
| D476,481 S | 7/2003 | Gilbert |
| 6,595,687 B2 | 7/2003 | Godshaw et al. |
| D478,782 S | 8/2003 | Li |
| 6,604,649 B1 | 8/2003 | Campi |
| 6,605,311 B2 | 8/2003 | Villagran et al. |
| 6,619,447 B1 | 9/2003 | Garcia, III et al. |
| 6,626,342 B1 | 9/2003 | Gleason |
| 6,629,430 B2 | 10/2003 | Mills et al. |
| D482,241 S | 11/2003 | Tyler |
| 6,652,933 B2 | 11/2003 | Hall |
| 6,655,543 B2 | 12/2003 | Beuke |
| D485,131 S | 1/2004 | Lanman et al. |
| D485,732 S | 1/2004 | Lanman et al. |
| D486,038 S | 2/2004 | Lanman et al. |
| 6,688,470 B2 | 2/2004 | Dege et al. |
| 6,729,758 B1 | 5/2004 | Carter |
| D492,160 S | 6/2004 | Lanman et al. |

(56) References Cited

U.S. PATENT DOCUMENTS

| | | |
|---|---|---|
| D497,518 S | 10/2004 | Bellofatto, Jr. et al. |
| 6,799,693 B2 | 10/2004 | Meza |
| D498,924 S | 11/2004 | Karl |
| D501,600 S | 2/2005 | Guyon |
| D502,599 S | 3/2005 | Cabana et al. |
| D503,279 S | 3/2005 | Smith |
| 6,874,356 B2 | 4/2005 | Kornfeldt et al. |
| D506,645 S | 6/2005 | Bellofatto, Jr. et al. |
| D512,274 S | 12/2005 | Cabey |
| D515,362 S | 2/2006 | Chan |
| D516,099 S | 2/2006 | Maruyama |
| D517,801 S | 3/2006 | Woo |
| D520,306 S | 5/2006 | Peterson |
| D523,243 S | 6/2006 | Nashmy |
| D527,226 S | 8/2006 | Maldonado |
| D530,089 S | 10/2006 | Silverman |
| 7,153,025 B1 | 12/2006 | Jackson et al. |
| D534,352 S | 1/2007 | Delafontaine |
| D534,771 S | 1/2007 | Zorn |
| D535,099 S | 1/2007 | Johansson et al. |
| D535,820 S | 1/2007 | Kamiya |
| 7,160,028 B1 * | 1/2007 | Linday ............. A45C 9/00 150/108 |
| 7,162,890 B2 | 1/2007 | Mogil et al. |
| D539,033 S | 3/2007 | Cassegrain |
| 7,201,285 B2 | 4/2007 | Beggins |
| 7,207,716 B2 | 4/2007 | Buchanan et al. |
| 7,219,814 B2 | 5/2007 | Lown et al. |
| 7,240,513 B1 | 7/2007 | Conforti |
| D547,941 S | 8/2007 | Lucena |
| D548,459 S | 8/2007 | Harvey |
| D550,448 S | 9/2007 | Boje et al. |
| 7,264,134 B2 | 9/2007 | Tulp |
| D557,667 S | 12/2007 | Kawamura et al. |
| 7,302,810 B2 | 12/2007 | McCrory |
| D560,102 S | 1/2008 | Sumter |
| 7,313,927 B2 | 1/2008 | Barker |
| 7,344,028 B2 | 3/2008 | Hanson |
| 7,353,952 B2 | 4/2008 | Swartz et al. |
| D570,603 S | 6/2008 | Wu et al. |
| D573,422 S | 7/2008 | Tagliati et al. |
| D574,667 S | 8/2008 | Grabijas, III et al. |
| D578,401 S | 10/2008 | Perry et al. |
| D582,151 S | 12/2008 | Gonzalez |
| 7,481,065 B2 | 1/2009 | Krieger |
| D598,194 S | 8/2009 | Turvey et al. |
| 7,597,478 B2 | 10/2009 | Pruchnicki et al. |
| D603,606 S | 11/2009 | Wang |
| 7,634,919 B2 | 12/2009 | Bernhard, Jr. et al. |
| D607,697 S | 1/2010 | Whitlock et al. |
| D608,096 S | 1/2010 | Noble |
| D608,159 S | 1/2010 | Whitlock et al. |
| D610,795 S | 3/2010 | Dejadon |
| D611,706 S | 3/2010 | Angles et al. |
| 7,669,436 B2 | 3/2010 | Mogil et al. |
| 7,682,080 B2 | 3/2010 | Mogil |
| D617,560 S | 6/2010 | Wu |
| 7,730,739 B2 | 6/2010 | Fuchs |
| D618,966 S | 7/2010 | Koehler et al. |
| D619,423 S | 7/2010 | Koehler et al. |
| D619,854 S | 7/2010 | Koehler et al. |
| D619,855 S | 7/2010 | Koehler et al. |
| 7,757,878 B2 | 7/2010 | Mogil et al. |
| D620,707 S | 8/2010 | Mogil |
| D620,708 S | 8/2010 | Sanz |
| 7,775,388 B2 | 8/2010 | Murrer, III |
| 7,784,759 B2 | 8/2010 | Farrell |
| 7,791,003 B2 | 9/2010 | Lockhart et al. |
| 7,811,620 B2 | 10/2010 | Merrill et al. |
| 7,815,069 B1 | 10/2010 | Bellofatto et al. |
| D626,329 S | 11/2010 | Chapelier |
| D627,199 S | 11/2010 | Pruchnicki |
| 7,841,207 B2 | 11/2010 | Mogil et al. |
| D629,612 S | 12/2010 | Weldon |
| 7,874,177 B2 | 1/2011 | Azamy |
| 7,900,816 B2 | 3/2011 | Kastanek et al. |
| D638,220 S | 5/2011 | Chu et al. |
| D642,870 S | 8/2011 | Whitlock et al. |
| 7,988,006 B2 | 8/2011 | Mogil et al. |
| D645,662 S | 9/2011 | Perez |
| 8,016,090 B2 | 9/2011 | McCoy et al. |
| 8,043,004 B2 | 10/2011 | Mogil |
| D648,532 S | 11/2011 | Sosnovsky |
| 8,061,159 B2 | 11/2011 | Mogil et al. |
| D650,169 S | 12/2011 | Klifa |
| 8,096,442 B2 | 1/2012 | Ramundi |
| D662,316 S | 6/2012 | Nitkin |
| 8,191,747 B2 | 6/2012 | Pruchnicki |
| D664,261 S | 7/2012 | Kravitz et al. |
| 8,209,995 B2 | 7/2012 | Kieling et al. |
| D666,896 S | 9/2012 | Pinholster, Jr. et al. |
| D667,043 S | 9/2012 | Couch, III |
| 8,281,950 B2 | 10/2012 | Potts et al. |
| 8,302,749 B2 | 11/2012 | Melmon et al. |
| D673,363 S | 1/2013 | Crandall |
| D674,664 S | 1/2013 | Collie |
| 8,424,713 B2 | 4/2013 | Bolland |
| D682,635 S | 5/2013 | Boroski |
| 8,453,899 B1 | 6/2013 | Calkin |
| D686,412 S | 7/2013 | Guichot |
| 8,474,640 B2 | 7/2013 | Armstrong |
| 8,516,848 B2 | 8/2013 | White et al. |
| 8,544,678 B1 | 10/2013 | Hughes |
| 8,573,002 B2 | 11/2013 | Ledoux et al. |
| D695,568 S | 12/2013 | Hayes |
| 8,622,235 B2 | 1/2014 | Suchecki |
| D699,940 S | 2/2014 | Robert |
| D699,941 S | 2/2014 | Robert |
| D703,946 S | 5/2014 | Tweedie |
| 8,720,739 B2 | 5/2014 | Bollis |
| 8,777,045 B2 | 7/2014 | Mitchell et al. |
| D710,085 S | 8/2014 | Szewczyk |
| D711,096 S | 8/2014 | Hanna |
| D712,555 S | 9/2014 | Berg |
| 8,827,109 B1 | 9/2014 | Sheehan |
| 8,844,756 B2 | 9/2014 | Beyburg |
| D715,544 S | 10/2014 | Levine |
| 8,857,654 B2 | 10/2014 | Mogil et al. |
| D717,041 S | 11/2014 | Pulliam |
| 8,875,964 B1 | 11/2014 | Vanderberg |
| 8,893,940 B2 | 11/2014 | Green et al. |
| D718,931 S | 12/2014 | Brundl |
| D719,303 S | 12/2014 | Anderson |
| 8,899,071 B2 | 12/2014 | Mogil et al. |
| D725,908 S | 4/2015 | Zwetzig |
| D728,942 S | 5/2015 | Byham |
| D732,295 S | 6/2015 | Aafjes |
| D732,348 S | 6/2015 | Seiders et al. |
| D732,349 S | 6/2015 | Seiders et al. |
| D732,350 S | 6/2015 | Seiders et al. |
| D732,899 S | 6/2015 | Seiders et al. |
| D734,643 S | 7/2015 | Boroski |
| D734,992 S | 7/2015 | Boroski |
| 9,084,463 B2 | 7/2015 | Merrill |
| D738,108 S | 9/2015 | Adler et al. |
| D739,654 S | 9/2015 | Brouard |
| 9,139,352 B2 | 9/2015 | Seiders et al. |
| 9,146,051 B2 | 9/2015 | Kamin et al. |
| D747,104 S | 1/2016 | Ford |
| 9,226,558 B2 | 1/2016 | Armstrong |
| D749,653 S | 2/2016 | Carnes |
| D750,140 S | 2/2016 | Cross |
| 9,254,022 B2 | 2/2016 | Meldeau et al. |
| 9,254,023 B2 | 2/2016 | Su et al. |
| 9,265,318 B1 | 2/2016 | Williams et al. |
| D752,347 S | 3/2016 | Seiders et al. |
| 9,271,553 B2 | 3/2016 | Ponx |
| 9,272,475 B2 | 3/2016 | Ranade et al. |
| 9,290,313 B2 | 3/2016 | De Lesseux et al. |
| D752,860 S | 4/2016 | Barilaro et al. |
| D756,109 S | 5/2016 | Hayashi |
| D756,638 S | 5/2016 | Frisoni |
| 9,366,467 B2 | 6/2016 | Kiedaisch et al. |
| 9,375,061 B2 | 6/2016 | Mosee |

(56) References Cited

U.S. PATENT DOCUMENTS

| | | |
|---|---|---|
| D760,494 S | 7/2016 | Harvey-Pankey |
| D761,561 S | 7/2016 | Cheng |
| D763,570 S | 8/2016 | Potts |
| D764,791 S | 8/2016 | Patel |
| D764,873 S | 8/2016 | Collie |
| 9,408,445 B2 | 8/2016 | Mogil et al. |
| D765,395 S | 9/2016 | Sanz |
| D768,981 S | 10/2016 | Kliot |
| D768,987 S | 10/2016 | Blumenfeld |
| D770,761 S | 11/2016 | Deioma et al. |
| D770,763 S | 11/2016 | Joo et al. |
| D771,372 S | 11/2016 | Kelly et al. |
| D772,562 S | 11/2016 | Petre |
| D778,045 S | 2/2017 | Ruddis |
| D782,820 S | 4/2017 | Thompson |
| D784,010 S | 4/2017 | Dumas |
| D785,325 S | 5/2017 | Samrelius et al. |
| D786,559 S | 5/2017 | Seiders et al. |
| D786,560 S | 5/2017 | Seiders et al. |
| D786,561 S | 5/2017 | Seiders et al. |
| D786,562 S | 5/2017 | Seiders et al. |
| D787,187 S | 5/2017 | Seiders et al. |
| D789,080 S | 6/2017 | Caffagni |
| D792,167 S | 7/2017 | Bradley |
| D792,486 S | 7/2017 | Li et al. |
| D793,089 S | 8/2017 | Jackson |
| D796,185 S | 9/2017 | Masten |
| D797,454 S | 9/2017 | Seiders et al. |
| D797,455 S | 9/2017 | Seiders et al. |
| D798,670 S | 10/2017 | Seiders et al. |
| D799,276 S | 10/2017 | Seiders et al. |
| D799,277 S | 10/2017 | Seiders et al. |
| D799,905 S | 10/2017 | Seiders et al. |
| D800,443 S | 10/2017 | Burton et al. |
| D800,444 S | 10/2017 | Burton et al. |
| D801,123 S | 10/2017 | Seiders et al. |
| 9,796,517 B2 | 10/2017 | Seiders et al. |
| D802,028 S | 11/2017 | Li |
| D802,029 S | 11/2017 | Li |
| D802,373 S | 11/2017 | Seiders et al. |
| D802,630 S | 11/2017 | Li et al. |
| D805,851 S | 12/2017 | Sullivan et al. |
| D808,173 S | 1/2018 | Seiders et al. |
| D808,175 S | 1/2018 | Seiders et al. |
| D808,655 S | 1/2018 | Seiders et al. |
| D808,730 S | 1/2018 | Sullivan et al. |
| D809,869 S | 2/2018 | Seiders et al. |
| D811,082 S | 2/2018 | Lehan |
| D811,746 S | 3/2018 | Seiders et al. |
| D813,539 S | 3/2018 | Van Assche |
| D814,879 S | 4/2018 | Larson et al. |
| D817,106 S | 5/2018 | Larson et al. |
| D817,107 S | 5/2018 | Larson et al. |
| D819,966 S | 6/2018 | Yu |
| D819,967 S | 6/2018 | Carter et al. |
| D821,825 S | 7/2018 | Sullivan et al. |
| D822,987 S | 7/2018 | Seiders et al. |
| D822,997 S | 7/2018 | Seiders et al. |
| D823,601 S | 7/2018 | Seiders et al. |
| D823,602 S | 7/2018 | Seiders et al. |
| 10,029,842 B2 | 7/2018 | Seiders et al. |
| D824,660 S | 8/2018 | Ross |
| D824,666 S | 8/2018 | Carter et al. |
| D824,671 S | 8/2018 | Pennington |
| D824,731 S | 8/2018 | Sullivan et al. |
| D827,299 S | 9/2018 | Vickery |
| D828,112 S | 9/2018 | Furneaux et al. |
| D828,728 S | 9/2018 | Jacobsen |
| D829,244 S | 9/2018 | Sullivan et al. |
| D830,048 S | 10/2018 | McQueeny |
| D830,132 S | 10/2018 | Sullivan et al. |
| D830,133 S | 10/2018 | Sullivan et al. |
| D830,134 S | 10/2018 | Sullivan et al. |
| D832,653 S | 11/2018 | Waskow et al. |
| D834,817 S | 12/2018 | Hoppe et al. |
| D834,895 S | 12/2018 | Triska et al. |
| D835,473 S | 12/2018 | Jacobsen |
| D835,949 S | 12/2018 | Triska et al. |
| D836,996 S | 1/2019 | Jacobsen |
| D836,997 S | 1/2019 | Jacobsen |
| D836,998 S | 1/2019 | Jacobsen |
| D836,999 S | 1/2019 | Jacobsen |
| D837,000 S | 1/2019 | Jacobsen |
| D837,001 S | 1/2019 | Jacobsen |
| D839,682 S | 2/2019 | Jacobsen |
| D840,194 S | 2/2019 | Furneaux et al. |
| D840,689 S | 2/2019 | Seiders et al. |
| D841,325 S | 2/2019 | Buynar |
| D844,975 S | 4/2019 | Munie et al. |
| D844,976 S | 4/2019 | Munie et al. |
| D844,977 S | 4/2019 | Munie et al. |
| D844,978 S | 4/2019 | Munie et al. |
| D844,979 S | 4/2019 | Munie et al. |
| D844,992 S | 4/2019 | Seiders et al. |
| D845,625 S | 4/2019 | Barlier |
| D846,275 S | 4/2019 | Barlier |
| D847,500 S | 5/2019 | Lagerfeld |
| D848,219 S | 5/2019 | Munie et al. |
| D848,220 S | 5/2019 | Munie et al. |
| D848,221 S | 5/2019 | Munie et al. |
| D848,222 S | 5/2019 | Munie et al. |
| D848,223 S | 5/2019 | Munie et al. |
| D848,798 S | 5/2019 | Munie et al. |
| D849,486 S | 5/2019 | Munie et al. |
| 2002/0197369 A1 | 12/2002 | Modler |
| 2003/0070447 A1 | 4/2003 | Tanaka |
| 2003/0080133 A1 | 5/2003 | Butler |
| 2003/0106895 A1 | 6/2003 | Kalal |
| 2003/0136702 A1 | 7/2003 | Redzisz et al. |
| 2003/0149461 A1 | 8/2003 | Johnson |
| 2003/0175394 A1 | 9/2003 | Modler |
| 2004/0004111 A1 | 1/2004 | Cardinale |
| 2004/0028296 A1 | 2/2004 | Meli |
| 2004/0035143 A1 | 2/2004 | Mogil |
| 2004/0074936 A1 | 4/2004 | McDonald |
| 2004/0094589 A1 | 5/2004 | Fricano |
| 2004/0136621 A1 | 7/2004 | Mogil |
| 2004/0144783 A1 | 7/2004 | Anderson et al. |
| 2004/0149600 A1 | 8/2004 | Wolter et al. |
| 2004/0164084 A1 | 8/2004 | Cooper |
| 2004/0237266 A1 | 12/2004 | Wang |
| 2005/0016895 A1 | 1/2005 | Glenn |
| 2005/0034947 A1 | 2/2005 | Nykoluk |
| 2005/0045520 A1 | 3/2005 | Johnson |
| 2005/0045521 A1 | 3/2005 | Johnson et al. |
| 2005/0056669 A1 | 3/2005 | Lavelle |
| 2005/0072181 A1 | 4/2005 | Mogil et al. |
| 2005/0133399 A1 | 6/2005 | Fidrych |
| 2005/0183446 A1 | 8/2005 | Fuchs |
| 2005/0196510 A1 | 9/2005 | Walters |
| 2005/0262871 A1 | 12/2005 | Bailey-Weston |
| 2005/0263528 A1 | 12/2005 | Maldonado et al. |
| 2005/0279124 A1 | 12/2005 | Maldonado |
| 2006/0007266 A1 | 1/2006 | Silverbrook |
| 2006/0021376 A1 | 2/2006 | Scroggs |
| 2006/0102497 A1 | 5/2006 | Wulf |
| 2006/0151533 A1 | 7/2006 | Simunovic et al. |
| 2006/0201979 A1 | 9/2006 | Achilles |
| 2006/0239593 A1 | 10/2006 | Fidrych |
| 2006/0240159 A1 | 10/2006 | Cash et al. |
| 2006/0248902 A1 | 11/2006 | Hunnell |
| 2007/0012593 A1 | 1/2007 | Kitchens et al. |
| 2007/0148305 A1 | 6/2007 | Sherwood et al. |
| 2007/0148307 A1 | 6/2007 | Sherwood et al. |
| 2007/0164063 A1 | 7/2007 | Concepcion |
| 2007/0217187 A1 | 9/2007 | Blakely et al. |
| 2007/0221693 A1 | 9/2007 | Moore |
| 2007/0237432 A1 | 10/2007 | Mogil |
| 2007/0261977 A1 | 11/2007 | Sakai |
| 2007/0274613 A1 | 11/2007 | Pruchnicki et al. |
| 2007/0290816 A1 | 12/2007 | Bedard |
| 2008/0038424 A1 | 2/2008 | Krusemann |
| 2008/0073364 A1 | 3/2008 | Simmons |
| 2008/0105282 A1 | 5/2008 | Fernholz et al. |

(56) References Cited

U.S. PATENT DOCUMENTS

| | | |
|---|---|---|
| 2008/0128421 A1 | 6/2008 | Ulbrand et al. |
| 2008/0160149 A1 | 7/2008 | Nasrallah et al. |
| 2008/0164265 A1 | 7/2008 | Conforti |
| 2008/0178865 A1 | 7/2008 | Retterer |
| 2008/0245096 A1 | 10/2008 | Hanson et al. |
| 2008/0260303 A1 | 10/2008 | De Lesseux et al. |
| 2008/0264925 A1 | 10/2008 | Lockhart et al. |
| 2008/0305235 A1 | 12/2008 | Gao et al. |
| 2009/0052809 A1 | 2/2009 | Sampson |
| 2009/0080808 A1 | 3/2009 | Hagen |
| 2009/0095757 A1 | 4/2009 | Ramundi |
| 2009/0280229 A1 | 11/2009 | Constantine et al. |
| 2009/0311378 A1 | 12/2009 | Wilaschin et al. |
| 2009/0317514 A1 | 12/2009 | Sizer |
| 2010/0047423 A1 | 2/2010 | Kruesemann et al. |
| 2010/0059199 A1 | 3/2010 | Court |
| 2010/0075006 A1 | 3/2010 | Semenza |
| 2010/0108694 A1 | 5/2010 | Sedlbauer et al. |
| 2010/0136203 A1 | 6/2010 | Sakata et al. |
| 2010/0143567 A1 | 6/2010 | Ye et al. |
| 2010/0224660 A1 | 9/2010 | Gleason |
| 2010/0284631 A1 | 11/2010 | Lee |
| 2011/0003975 A1 | 1/2011 | Arase et al. |
| 2011/0005739 A1 | 1/2011 | Finney et al. |
| 2011/0030415 A1 | 2/2011 | Breyburg et al. |
| 2011/0097442 A1 | 4/2011 | Harju et al. |
| 2011/0108562 A1 | 5/2011 | Lyons |
| 2011/0167863 A1 | 7/2011 | Herrbold |
| 2011/0182532 A1 | 7/2011 | Baltus |
| 2011/0191933 A1 | 8/2011 | Gregory et al. |
| 2011/0284601 A1 | 11/2011 | Pullin |
| 2011/0311166 A1 | 12/2011 | Pascua |
| 2012/0106130 A1 | 5/2012 | Beaudette |
| 2012/0137637 A1 | 6/2012 | Gillis |
| 2012/0180184 A1 | 7/2012 | Crye |
| 2012/0181211 A1 | 7/2012 | Charlebois |
| 2012/0187138 A1 | 7/2012 | Vasquez et al. |
| 2012/0261445 A1 | 10/2012 | Demskey |
| 2012/0294550 A1 | 11/2012 | Hassman et al. |
| 2012/0311828 A1 | 12/2012 | Nir |
| 2013/0014355 A1 | 1/2013 | Lee |
| 2013/0043285 A1 | 2/2013 | Cordray |
| 2013/0174600 A1 | 7/2013 | Sarcinella |
| 2013/0216158 A1 | 8/2013 | Meldeau et al. |
| 2013/0264350 A1 | 10/2013 | Handlon et al. |
| 2013/0294712 A1 | 11/2013 | Seuk |
| 2013/0341338 A1 | 12/2013 | Mitchell et al. |
| 2014/0023295 A1 | 1/2014 | Wagner |
| 2014/0034543 A1 | 2/2014 | Grubstein |
| 2014/0151172 A1 | 6/2014 | Diaz |
| 2014/0226920 A1 | 8/2014 | Passavia |
| 2014/0248003 A1 | 9/2014 | Mogil et al. |
| 2014/0254956 A1 | 9/2014 | Buell, III |
| 2014/0270590 A1 | 9/2014 | Ostroy |
| 2014/0366336 A1 | 12/2014 | Chung |
| 2015/0008242 A1 | 1/2015 | Kpabar, Jr. |
| 2015/0114024 A1 | 4/2015 | Grepper |
| 2015/0136796 A1 | 5/2015 | Muehlhauser |
| 2015/0175338 A1 | 6/2015 | Culp et al. |
| 2015/0225164 A1 | 8/2015 | Seiders et al. |
| 2015/0335202 A1 | 11/2015 | Wisner et al. |
| 2015/0353263 A1 | 12/2015 | Seiders et al. |
| 2016/0066817 A1 | 3/2016 | Hannes |
| 2016/0100661 A1 | 4/2016 | Redzisz et al. |
| 2016/0101924 A1 | 4/2016 | Mitchell et al. |
| 2016/0107816 A1 | 4/2016 | Larpenteur et al. |
| 2016/0236849 A1 | 8/2016 | Seiders et al. |
| 2016/0255943 A1 | 9/2016 | Houston et al. |
| 2016/0257479 A1 | 9/2016 | Seiders et al. |
| 2016/0338462 A1 | 11/2016 | Hayashi |
| 2016/0338908 A1 | 11/2016 | Rice et al. |
| 2017/0036844 A1 | 2/2017 | Seiders et al. |
| 2017/0071304 A1 | 3/2017 | Wang |
| 2017/0071305 A1 | 3/2017 | Wang |
| 2017/0099920 A1 | 4/2017 | Bailey |
| 2017/0210542 A1 | 7/2017 | Seiders et al. |
| 2017/0225872 A1 | 8/2017 | Collie |
| 2018/0016084 A1 | 1/2018 | Xia et al. |
| 2018/0098607 A1 | 4/2018 | Seiders et al. |
| 2018/0162626 A1 | 6/2018 | Munie et al. |
| 2018/0242701 A1 | 8/2018 | Seiders et al. |
| 2018/0263346 A1 | 9/2018 | Stephens |
| 2018/0279733 A1 | 10/2018 | Young et al. |
| 2018/0317620 A1 | 11/2018 | Larson et al. |
| 2019/0170422 A1 | 6/2019 | Dexter |

FOREIGN PATENT DOCUMENTS

| | | |
|---|---|---|
| CA | 2300014 A1 | 8/2001 |
| CA | 2327764 A1 | 6/2002 |
| CA | 2433251 A1 | 12/2004 |
| CA | 2483802 A1 | 4/2006 |
| CA | 2498796 A1 | 9/2006 |
| CA | 2499291 A1 | 9/2006 |
| CA | 2503473 A1 | 10/2006 |
| CA | 2548064 A1 | 11/2007 |
| CA | 2549327 A1 | 11/2007 |
| CA | 2633223 A1 | 12/2009 |
| CA | 2782668 A1 | 12/2013 |
| CN | 2125339 U | 12/1992 |
| CN | 2188899 Y | 2/1995 |
| CN | 201062136 Y | 5/2008 |
| CN | 101500900 A | 8/2009 |
| CN | 201948200 U | 8/2011 |
| CN | 101500900 B | 9/2011 |
| CN | 102717977 A | 10/2012 |
| CN | 202619972 U | 12/2012 |
| CN | 202959175 U | 6/2013 |
| CN | 103385657 A | 11/2013 |
| CN | 302623771 | 11/2013 |
| CN | 302623775 | 11/2013 |
| CN | 302769710 | 3/2014 |
| CN | 302956550 | 10/2014 |
| CN | 303100086 | 2/2015 |
| CN | 303342902 | 8/2015 |
| DE | 3539626 A1 | 5/1987 |
| DE | 20002689 U1 | 8/2000 |
| DE | 202011050174 U1 | 7/2011 |
| DE | 202013101115 U1 | 3/2013 |
| EP | 0037545 A2 | 10/1981 |
| EP | 0082131 A2 | 6/1983 |
| EP | 85534 A1 | 8/1983 |
| EP | 0158634 A1 | 10/1985 |
| EP | 0174159 A2 | 3/1986 |
| EP | 0238932 A1 | 9/1987 |
| FR | 1269009 A | 8/1961 |
| FR | 2440886 A1 | 6/1980 |
| GB | 1600133 A | 10/1981 |
| GB | 2249717 A | 5/1992 |
| GB | 2335972 A | 10/1999 |
| GB | 3004135 | 9/2002 |
| GB | 3006367 | 10/2002 |
| JP | 11051532 | 2/1999 |
| JP | 3275477 B2 | 4/2002 |
| JP | D1160335 | 12/2002 |
| JP | 2003026258 A | 1/2003 |
| JP | D1213384 | 8/2004 |
| JP | D1242111 | 6/2005 |
| JP | 2010023926 A | 2/2010 |
| JP | D1445624 | 7/2012 |
| KR | 20020027739 A | 4/2002 |
| KR | 20040092730 A | 11/2004 |
| KR | 300778570.0000 | 1/2015 |
| KR | 30080866.0000 | 8/2015 |
| KR | 300835242.0000 | 1/2016 |
| KR | 300853718.0000 | 5/2016 |
| WO | 9524146 A2 | 9/1995 |
| WO | 9812954 A1 | 4/1998 |
| WO | 02058500 A1 | 8/2002 |
| WO | 2006007266 A2 | 1/2006 |
| WO | 2006058538 A1 | 6/2006 |
| WO | 2007016092 A2 | 2/2007 |
| WO | 2010106296 A2 | 9/2010 |
| WO | 2010120199 A1 | 10/2010 |

(56) References Cited

FOREIGN PATENT DOCUMENTS

| WO | 2012003543 A1 | 1/2012 |
|---|---|---|
| WO | 2014033450 A1 | 3/2014 |
| WO | 2014066026 A1 | 5/2014 |
| WO | 2016066817 A1 | 5/2016 |
| WO | 2017136754 A1 | 8/2017 |
| WO | 2017197230 A1 | 11/2017 |

OTHER PUBLICATIONS

Jun. 5, 2019—(AU) Notice of Acceptance for Patent Application—App 2017263566.
Feb. 4, 2019—(AU) Examination Report—App. No. 2017263566.
Oct. 2, 2019—(CN) Examiner's Report—App. No. 2017032351.
Stopper Dry Bag, http://www.seatosummit.com/products/display/181, published date unknown, but prior to the filing late of the present application, Sea to Summit, United States.
ICEMULE Classic Cooler—Large (20L), http://www.icemulecooler.com/icemule-classic-cooler-large-20l/, published date unknown, but prior to the filed of the present application, ICEMULE, United States.
Devonbuy.com: Thule Gauntlet 13" MacBook Pro Attaché. Published on Jul. 28, 2014. Retrieved from the internet at <http://www.devonbuy.com/thule-gauntlet-13-macbook-pro-attache/>, Feb. 24, 2016. 9 pages.
United States District Court for the Western District of Texas, Austin Division, "Defendants' Answer and Counterclaims to YETI's Complaint," *YETI Coolers, LLC*, vs. *RTIC Soft Sided Coolers, LLC, RTIC Coolers, LLC, RTIC Web Services, LLC, and Corporate Support and Fulfillment, LLC*, Case 1:16-cv-00909-RP, Document 11, Filed Aug. 18, 2016, 44 pages.
United States District Court Western District of Texas, Austin Division, "Complaint," *YETI Coolers, LLC*, v. *RTIC Soft Side Coolers, RTIC Coolers, LLC, RTIC Web Services, LLC, and Corporate Support and Fulfillment, LLC*, Case 1:16-cv-00909, Document 1, Filed Jul. 27, 2016, 66 pages.
United States District Court Western District of Texas, Austin Division, "Complaint for Damages and Injunctive Relief," *YETI Coolers, LLC* v. *Jennifer Leverne Bootz Evans d/b/a Bling and Burlap Buy In's and Blanks*, Case 1:15-cv-00995, Document 1, Filed Nov. 2, 2015, 128 pages.
United States District Court Western District of Texas, Austin Division, "Order," *YETI Coolers, LLC* v. *Jennifer Leverne Bootz Evans d/b/a Bling and Burlap Buy In's and Blanks*, Case 1:15-cv-00995-RP, Document 18, Filed Apr. 18, 2016, 1 page.
United States District Court Western District of Texas, Austin Division, "Defendant's Reply in Support of Their Rule 12 (B)(6) Motion to Dismiss for Failure to State a Claim" *YETI Coolers, LLC* v. *RTIC Soft Sided Coolers, LLC, RTIC Coolers, LLC, RTIC Web Services, LLC, and Corporate Support and Fulfillment, LLC*, Case 1:16-cv-00909-RP, Document 15, Filed Sep. 8, 2016, 13 pages.
United States District Court Western District of Texas, Austin Division, "YETI's Answer to RTIC's Counterclaims," *YETI Coolers, LLC* v. *RTIC Soft Sided Coolers, LLC, RTIC Coolers, LLC, RTIC Web Services, LLC, and Corporate Support and Fulfillment, LLC*, Case 1:16-cv-00909-RP, Document 14, Filed Sep. 2, 2016, 16 pages.
United States District Court Western District of Texas, Austin Division, "YETI's Opposition to RTIC's Motion to Dismiss," *YETI Coolers, LLC* v. *RTIC Soft Sided Coolers, LLC, RTIC Coolers, LLC, RTIC Web Services, LLC, and Corporate Support and Fulfillment, LLC*, Case 1:16-cv-00909-RP, Document 13, Filed Sep. 1, 2016, 17 pages.
United States District Court for the Western District of Texas, Austin Division, "Defendants' Rule 12(6)(6) Motion to Dismiss for Failure to State a Claim," *YETI Coolers, LLC*, vs. *RTIC Soft Sided Coolers, RTIC Coolers, LLC, RTIC Web Services, LLC, and Corporate Support and Fulfillment, LLC*, Case 1:16-cv-00909-RP, Document 10, Filed Aug. 18, 2016, 12 pages.
United States District Court for the Western District of Texas, Austin Division, "Joint Rule 26(f) Report and Discovery Plan," *YETI Coolers, LLC*, vs. *RTIC Soft Sided Coolers, RTIC Coolers, LLC, RTIC Web Services, LLC, and Corporate Support and Fulfillment, LLC*, Case 1:16-cv-00909-RP, Document 19, Filed Oct. 11, 2016, 9 pages.
Petition for Inter Partes Review of U.S. Pat. No. 9,139,352, filed on Dec. 13, 2016, 1616 pages.
TheGadgeteer.com: Tom Bihn Camera I-O Bag Review. Published Jul. 9, 2012. Retrieved from the internet at <http://the-gadgeteer.com/2012/07/09/tom-bihn-camera-i-o-bag-review/>, Jan. 11, 2016. 7 pages.
YouTube-com: Patagonia Black Hole Duffel 60L. Published Aug. 26, 2013. Retrieved from the internet at <https://www.youtube.com/watch?v=W-PWEmZmVv8>, Dec. 19, 2016. 1 page.
Youtube, "YETI Hopper Cooler at ICAST 2014", Uploaded by user TackleDirect on Jul. 17, 2014, Accessed Jan. 31, 2017. (https://www.youtube.com/watch?v=A2rKRdyZcZ4).
Ebags, Picnic Pack Picnic Pack Large Insultated Cooler Tote, First reviewed on Jul. 20, 2016. Accessed Feb. 7, 2017. (http://www.ebags.com/product/picnic-pack/picnic-pack-large-insulated-cooler-tote/313704?productid=10428840).
United States Patent and Trademark Office Before the Patent Trial and Appeal Board, Decisions Joint Motions to Terminate Inter Partes Review, Entered Mar. 22, 2017—(4 pgs).
Jan. 31, 2017—(WO) International Search Report and Written Opinion—App. PCT/US2016/060135.
Mar. 27, 2017—(WO) International Search Report and Written Opinion—App PCT/US2017/016552.
United States District Court Western District of Texas Austin Division, "Complaint," *YETI Coolers, LLC* v. *Glacier Coolers, LLC, and Tecomate Holdings, LLC*, Case 1:17-cv-00586, Document 1, filed Jun. 15, 2017, 161 pages.
May 30, 2017—(WO) ISR—App. No. PCT/US17/32351.
May 30, 2017—(WO) Written Opinion—App. No. PCT/US17/32351.
Vimeo, "Cleaning Your YETI Hopper" uploaded by user YETI Coolers on Nov. 4, 2014, Accessed Sep. 27, 2017.(https://vimeo.com/11 0890075).
Good Housekeeping, "Lands' End Zip Top Cooler Tote #433786", Reviewed on Apr. 2014, Accessed Nov. 18, 2017. (http://www.goodhousekeeping.com/travel-products/food-cooler-reviews/a33270/lands-end-zip-top-cooler-tote-433786/).
Home Shopping Network, "Built New York Large Welded Cooler Bag", Accessed Nov. 18, 2017. (https://www.hsn.com/products/built-new-york-large-welded-cooler-bag/8561 033).
Aug. 29, 2018 (WO)—International Search Report and Written Opinion—App. No. PCT/US18/36608.
Mar. 21, 2019—(WO) International Search Report and Written Opinion—App. No. PCT/US2018/066040.
Jun. 3, 2019—(CN) First Office Actiont—App. No. 201680076714.8.

* cited by examiner

INSULATING CONTAINER

This application is a continuation application of U.S. application Ser. No. 15/790,926, filed Oct. 23, 2017, (now U.S. Pat. No. 9,139,352, issued Oct. 15, 2019), which is a continuation application of U.S. application Ser. No. 14/831,641, filed Aug. 20, 2015 which is a divisional of U.S. application Ser. No. 14/479,607, filed on Sep. 8, 2014 (now U.S. Pat. No. 9,139,352, issued Sep. 22, 2015), which claims priority to U.S. Application No. 61/937,310 filed on Feb. 7, 2014, which is incorporated fully herein by reference.

FIELD

The present disclosure relates generally to non-rigid, portable, insulated devices or containers useful for keeping food and beverages cool or warm, and, more particularly, an insulating device with a waterproof closure.

BACKGROUND

Coolers are designed to keep food and beverages at lower temperatures. Containers may be composed of rigid materials such as metal or plastics or flexible materials such as fabric or foams. Coolers can be designed to promote portability. For example, rigid containers can be designed to incorporate wheels that facilitate ease of transport or coolers can be designed in smaller shapes to allow individuals to carry the entire device. Non-rigid containers can be provided with straps and/or handles and may in certain instances be made of lighter weight materials to facilitate mobility. Non-rigid coolers that maximize portability can be designed with an aperture on the top that allows access to the interior contents of the cooler. The aperture can also be provided with a closure.

SUMMARY

This Summary provides an introduction to some general concepts relating to this invention in a simplified form that are further described below in the Detailed Description. This Summary is not intended to identify key features or essential features of the invention.

Aspects of the disclosure herein may relate to insulating devices having one or more of (1) a waterproof closure (2) an outer shell, (3) an inner liner, (4) an insulating layer floating freely in between the outer shell and the inner liner, or (5) a waterproof storage compartment.

BRIEF DESCRIPTION OF THE DRAWINGS

The foregoing Summary, as well as the following Detailed Description, will be better understood when considered in conjunction with the accompanying drawings in which like reference numerals refer to the same or similar elements in all of the various views in which that reference number appears.

DETAILED DESCRIPTION

Figure 1A:
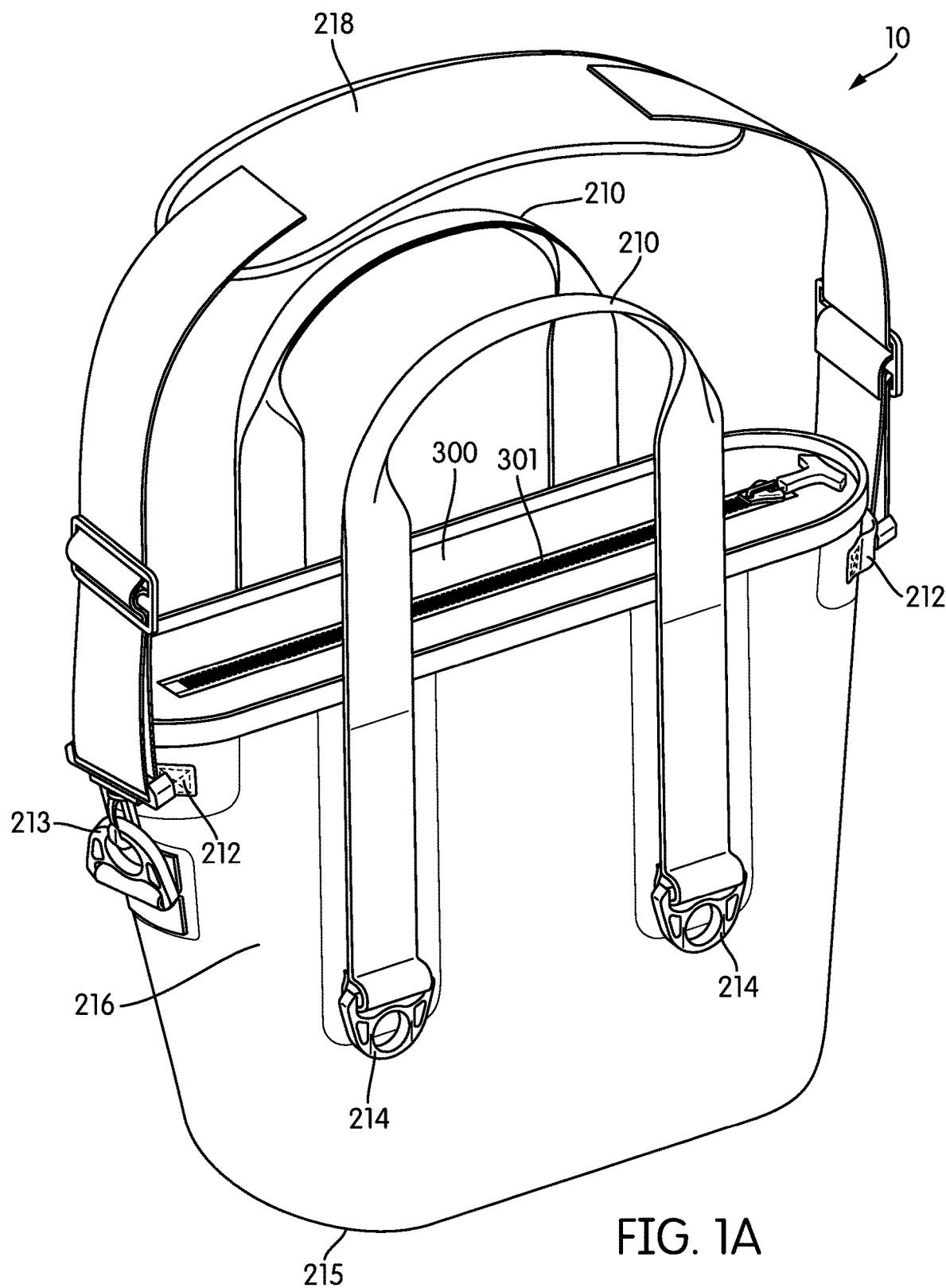
FIG. 1A shows a left front perspective view of an example insulating device in accordance with an aspect of the disclosure.
Figure 1B:
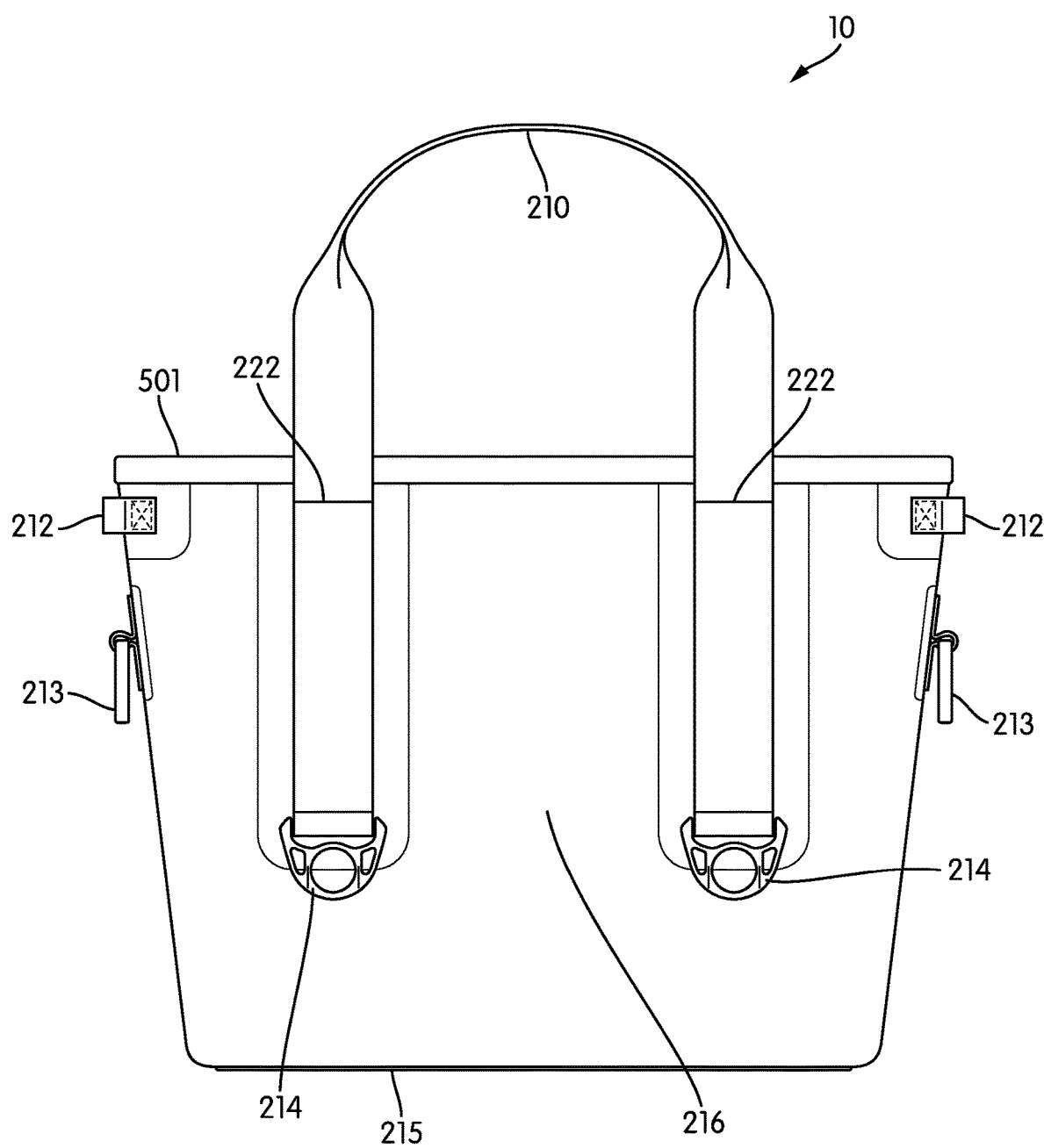
FIG. 1B shows a frontside perspective view of the example insulating device of FIG. 1A without the shoulder strap.

In the following description of the various examples and components of this disclosure, reference is made to the accompanying drawings, which form a part hereof, and in which are shown by way of illustration various example structures and environments in which aspects of the disclosure may be practiced. It is to be understood that other structures and environments may be utilized and that structural and functional modifications may be made from the specifically described structures and methods without departing from the scope of the present disclosure.

Also, while the terms "frontside," "backside," "top," "base," "bottom," "side," "forward," and "rearward" and the like may be used in this specification to describe various example features and elements, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of the claims.

FIGS. 1-4 depict an exemplary insulating device 10 that can be configured to keep desired contents stored cool or warm for an extended period of time. The insulating device can generally include an outer shell 501, a closure 301, an insulating layer 502, and an inner liner 500. As shown in FIG. 3C, the inner liner 500 forms a chamber or receptacle 504 for receiving the desired contents therein. As shown in FIG. 1A, various handles, straps, and webs (e.g. 210, 212, 218, 224) can also be included on the insulating device 10 for carrying, holding, or securing the insulating device 10.

The insulating device 10 can be configured to keep desired contents stored in the receptacle 504 cool or warm for an extended period of time. In one example, the insulating device 10 can also be designed to maintain water inside the inner chamber or receptacle 504, and the insulating device 10 can be configured to be water "resistant" from the outside in. In other words, insulating device 10 can be formed "water tight" inside the inner liner 500, and water cannot leak into the inner liner 500 from the outside or out from the inside of the inner liner 500 when the closure 301 is in the closed position.

Figure 4:
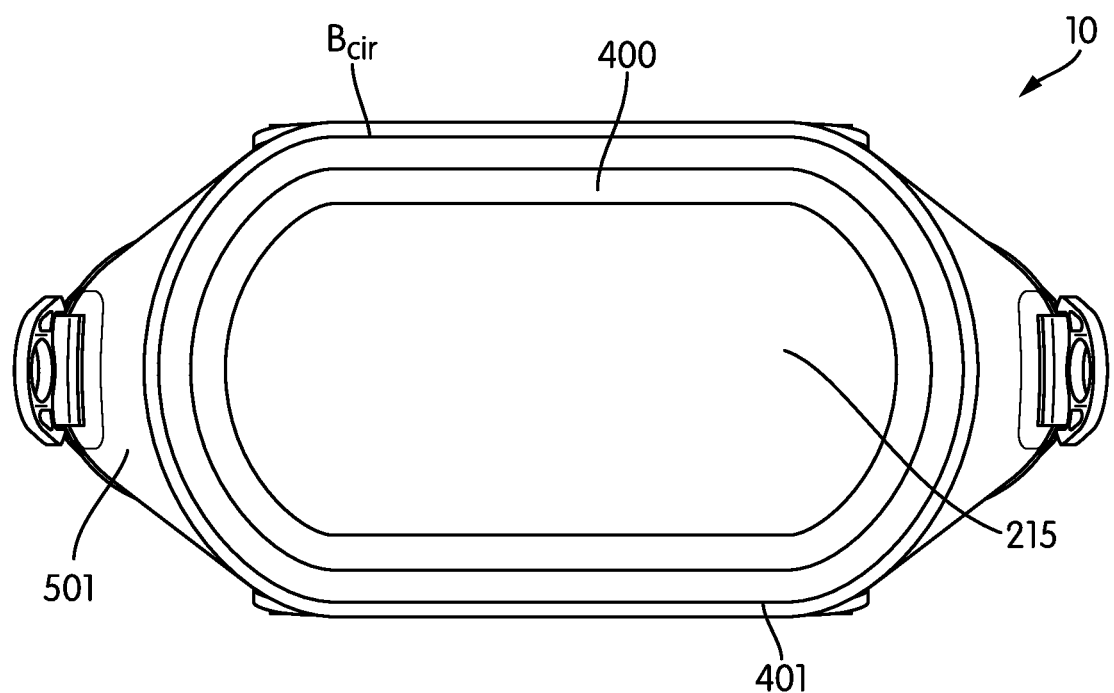
FIG. 4 shows a bottom perspective view of the example insulating device of FIG. 1A.

FIG. 4 depicts a bottom view of the insulating device 10. As shown in FIG. 4 the insulating device 10 may include a base 215 and a base support ridge 400. The base support ridge 400 can provide structural integrity and support to the insulating device 10 when the insulating device 10 is placed onto a surface.

Figure 3A:
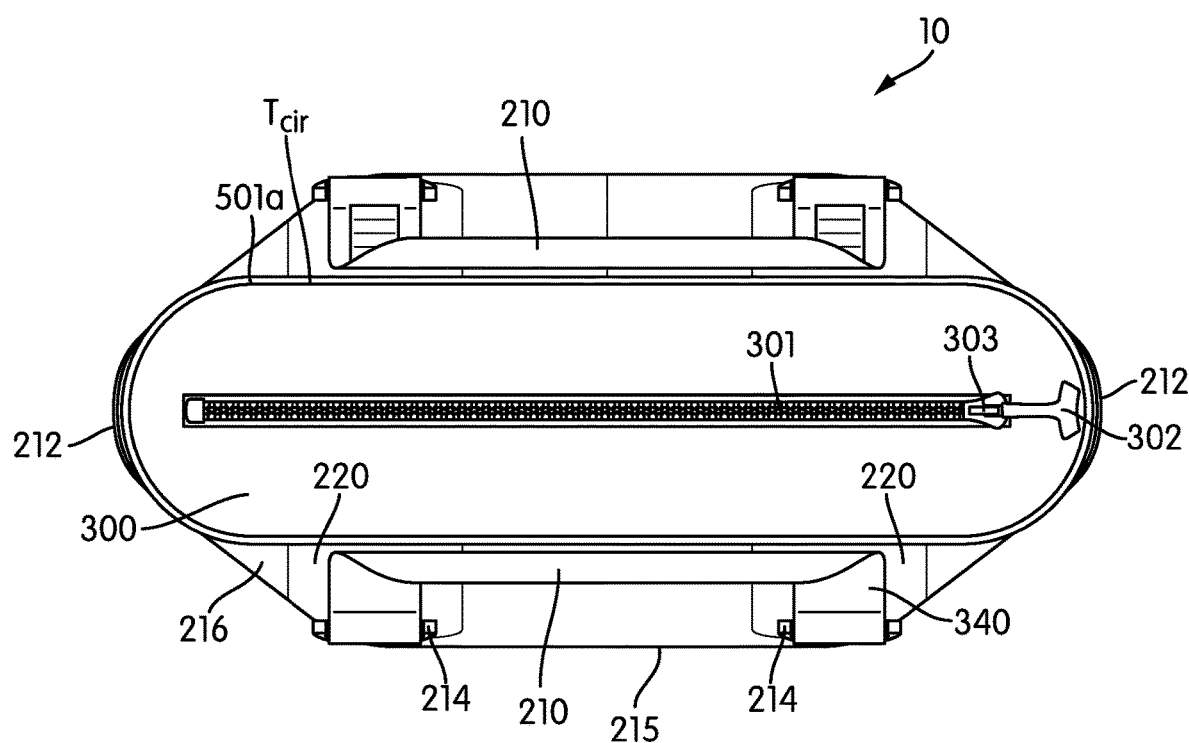
FIG. 3A shows a top perspective view of the example insulating device of FIG. 1A without the shoulder strap.

In one example, as shown in FIGS. 3A and 4, the top of the outer shell 501 has a first perimeter circumference ($T_{cir}$) and the bottom of the outer shell 501 has a second perimeter circumference or a base perimeter 401 ($B_{cir}$). The circumference of the top of the outer shell 501 can be equal to the circumference on the bottom when folded into a cylinder, and $B_{cir}$ can be equal to $T_{cir}$. In one example, the first circumference and the second circumference can both have an oval shape to form an elongated or elliptical cylinder. In one example, the top outer layer 501a can have a length of 23.5 inches and a width of 5.5 inches. Therefore, the length to width ratio of the top outer layer 501a can be approximately 4.3. Additionally, the base 215 can have a length of 20.0 inches and a width of 12.25 inches. Therefore, the length to width ratio of the base 215 is approximately 1.6. In this example, the length to width ratio of the upper wall can be greater than the length to width ratio of the base.

Figure 5A:
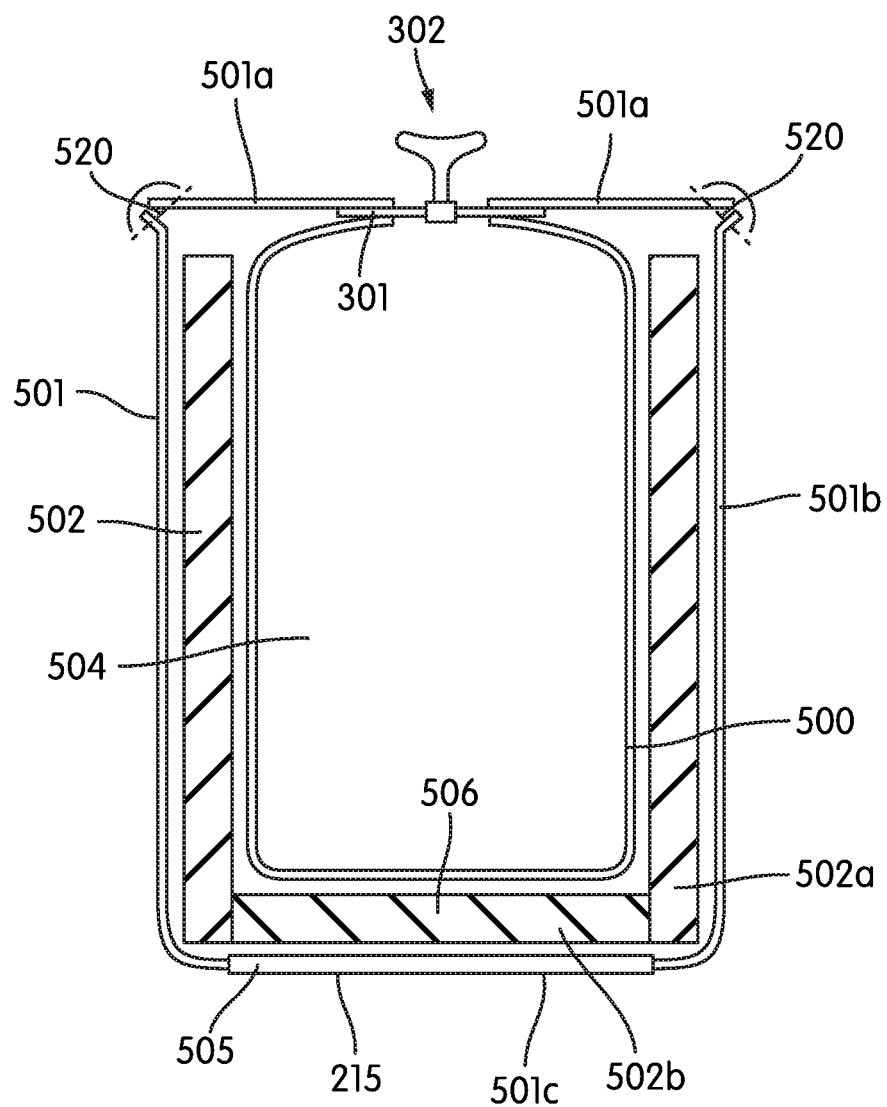
FIG. 5A illustrates a schematic of a cross-sectional view of the example insulating device of FIG. 1A.

In one example, as shown in FIG. 5A the inner layer or inner liner 500 can be formed of a top inner liner portion or first portion 500a, an inner layer mid portion or second portion 500b, and an inner layer bottom portion 500c. The top inner liner portion 500a, the inner layer mid portion 500b, and the inner layer bottom portion 500c are secured together, by for example welding, to form the chamber 504. The chamber 504 can be a "dry bag," or vessel for storing contents. In one example, after the top inner liner portion 500a, the inner layer mid portion 500b, and the inner layer bottom portion 500c are secured or joined together, a tape, such as a TPU tape can be place over the seams joining the sections of the chamber 504. The inner liner 500 can, thus, either maintain liquid in the chamber 504 of the insulating device 10 or prevent liquid contents from entering into the chamber 504 of the insulating device 10. In one example, as will be described in further detail below, the inner liner 500 can be suspended in the insulating device 10 by only the closure 301.

The insulating layer 502 can be located between the inner liner 500 and the outer shell 501, and can be formed as a foam insulator to assist in maintaining the internal temperature of the receptacle 504. In one example, the insulating layer 502 can be a free floating layer that is not attached directly to the outer shell 501 or the inner liner 500. The insulating layer 502 can be formed of a first portion 502a and a second portion or base portion 502b. The first portion 502a and the second portion 502b can be formed of an insulating foam material as will be described in further detail below.

The first portion 502a can have a rectangular shape that maintains its form when folded into a cylinder and placed in between the inner liner 500 and the outer shell 501 and when encased from above by the outer shell 501. The insulating layer 502 maintains its shape which results in the basic oval-cylindrical shape of the insulating device 10. Therefore, similar to the outer shell 501, the top of the insulating layer 502 has a first perimeter circumference, and the bottom of the insulating layer 502 has a second perimeter circumference. The first perimeter circumference of the insulating layer 502 can be equal to the second perimeter circumference of the insulating layer 502.

The base portion 502b can be included to provide additional insulation along the insulating device 10 at base 215. The base portion 502b can be formed as an oval shape to close off a lower opening 506 formed by the cylindrical shape of the insulating layer 502.

Additionally, the bottom portion of the insulating device 10 can include an additional base-support layer 505, which adds to the insulation and the structural integrity of the insulating device 10. The base support layer 505 may also provide additional protection around the bottom of the insulating device 10. In one example, the base support layer 505 can be formed from EVA foam. The base support layer 505 may include a certain design such as a logo or name that can be molded or embossed directly into the material. The base support ridge 400, which provides structural integrity and support to the insulating device 10 can also be molded or embossed directly into the base support layer 505. In one example, the base support layer 505 and the base portion 502b can be detached for ease of assembly.

The outer shell 501 can be formed of a top outer layer portion or first shell portion 501a, an outer layer or second outer shell portion 501b, and a bottom or third shell portion 501c. The outer shell 501 provides a covering for the insulating device 10. In one example, the insulating layer 502 can be suspended freely within the outer shell 501. However, it is contemplated that any of the layers could be secured or formed as a one-piece integral structure. The outer shell 501 can be configured to support one or more optional handles or straps (e.g. 210, 212, 218). In this regard, the outer shell 501 can also include multiple reinforcement areas or patches 220 that are configured to assist in structurally supporting the optional handles or straps (e.g. 210, 212, 218). The handles or straps (e.g. 210, 212, 218) and other attachments can be stitched using threads 222, however these threads 222 do not, in one example, extend through the outer shell 501 into the insulating layer 502. Rather, the threads are sewn to the patches 220, and the patches 220 can be RF welded to the outer shell 501 or by any other method disclosed herein.

As shown in FIG. 5A, the first outer shell portion 501a may be attached to the second shell portion 501b by stitching 510. However, the first outer shell portion 501a can be attached to the second shell portion 501b using any known method, e.g., polymer welding, or other adhesive around the entire perimeter of the second shell portion 501b.

Additionally, in one example, the base-support layer 505 formed from EVA foam can be secured to bottom or third shell portion 501c by lamination. The second shell portion 501b can be secured to the third shell portion 501c and the base-support layer 505 by polymer welding (e.g. RF welding), stitching, or adhesives.

The insulating device 10 can include two carry handles 210 that are connected to the frontside 216 of the insulating device 10 and the backside 217 of the insulating device 10. In one particular example, a shoulder strap 218 can be attached via plastic or metal clip to the ring 214 attached to side handles 212 to facilitate carrying insulating device 10 over the shoulder. The insulating device 10 may also include side handles 212 on each end of the cooler. The side handles 212 provide the user with another option for grasping and carrying the insulating device.

Carry handles 210 may also form a slot for receiving rings 214 near the bottom of the attachment point of the carry handles to the insulating device 10. The rings 214 can be secured to the carry handles 210 and the attachment points 213 by stitching, adhesive, or polymer welding and can be used to help secure or tie down the insulating device 10 to another structure such as a vehicle, vessel, camping equipment, and the like or various objects such as keys, water bottle bottles, additional straps, bottle openers, tools, other personal items, and the like.

Figure 2:
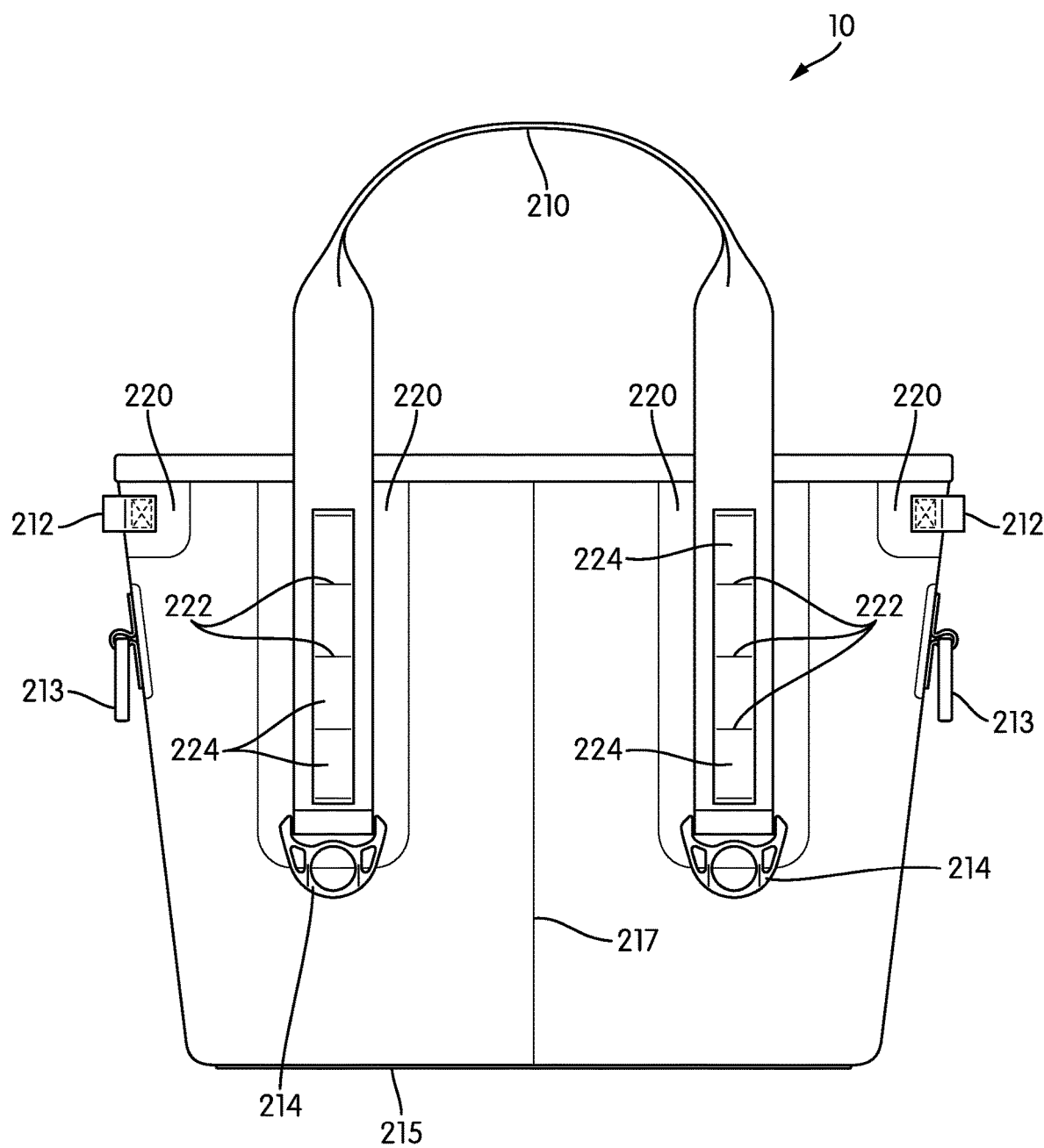
FIG. 2 shows a backside perspective view of the example insulating device of FIG. 1A without the shoulder strap.

Additionally, as shown in FIG. 2, webbing formed as loops 224 can be sewn onto the straps forming the handles 210 on the back of the insulating device 10. The loops 224 can be used to attach items (e.g., carabineers, dry bags) to the insulating device 10. The side handles 212 can also provide the user with another option for securing the insulating device 10 to a structure.

In one example, the carry handles 210, side handles 212, shoulder strap 218 and attachment points 213 can be constructed of nylon webbing. Other materials may include polypropylene, neoprene, polyester, Dyneema, Kevlar, cotton fabric, leather, plastics, rubber, or rope. The carry handles 210 and side handles 212 can be attached to the outer shell by stitching, adhesive, or polymer welding.

The shoulder strap 218 can be attached to the insulating device 10 at attachment points 213. The attachment points 213 can be straps that also form a slot for receiving rings 214. The rings 214 can provide for the attachment of the shoulder strap 218.

In one example, the rings 214 can be Acetal D-rings. Rings 214 in can be plastic, metal, ceramic, glass, alloy, polypropylene, neoprene, polyester, Dyneema, and Kevlar, cotton fabric, leather, plastics, rubber, or rope. Rings 214 can include other shapes, sizes, and configurations other than a "D" shape. Examples include round, square, rectangular, triangular, or rings with multiple attachment points. Additionally, pockets or other storage spaces can be attached to the outside of the insulating device 10 in addition to the carry handles 210 and side handles 212.

In one example, the closure 301 can be substantially waterproof or a barrier to prevent liquid contents from either entering or exiting the insulating device. Additionally, the closure 301 can be impervious to liquid such that insulating device 10 liquid penetration is prevented at any orientation of the insulating device 10. Also maintaining the closure 301 in flat plane can assist in providing a water tight seal.

Figure 3B:
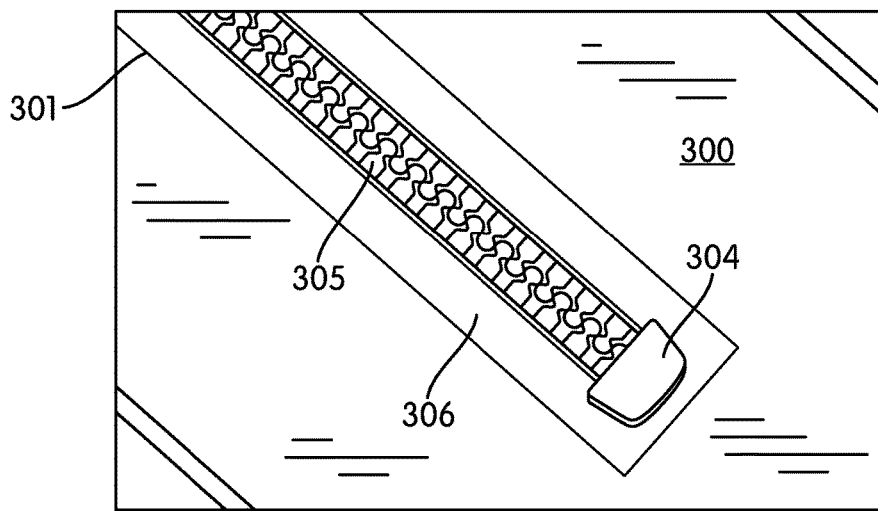
FIG. 3B shows a top view of a portion of the example insulating device of FIG. 1A.
Figure 3C:
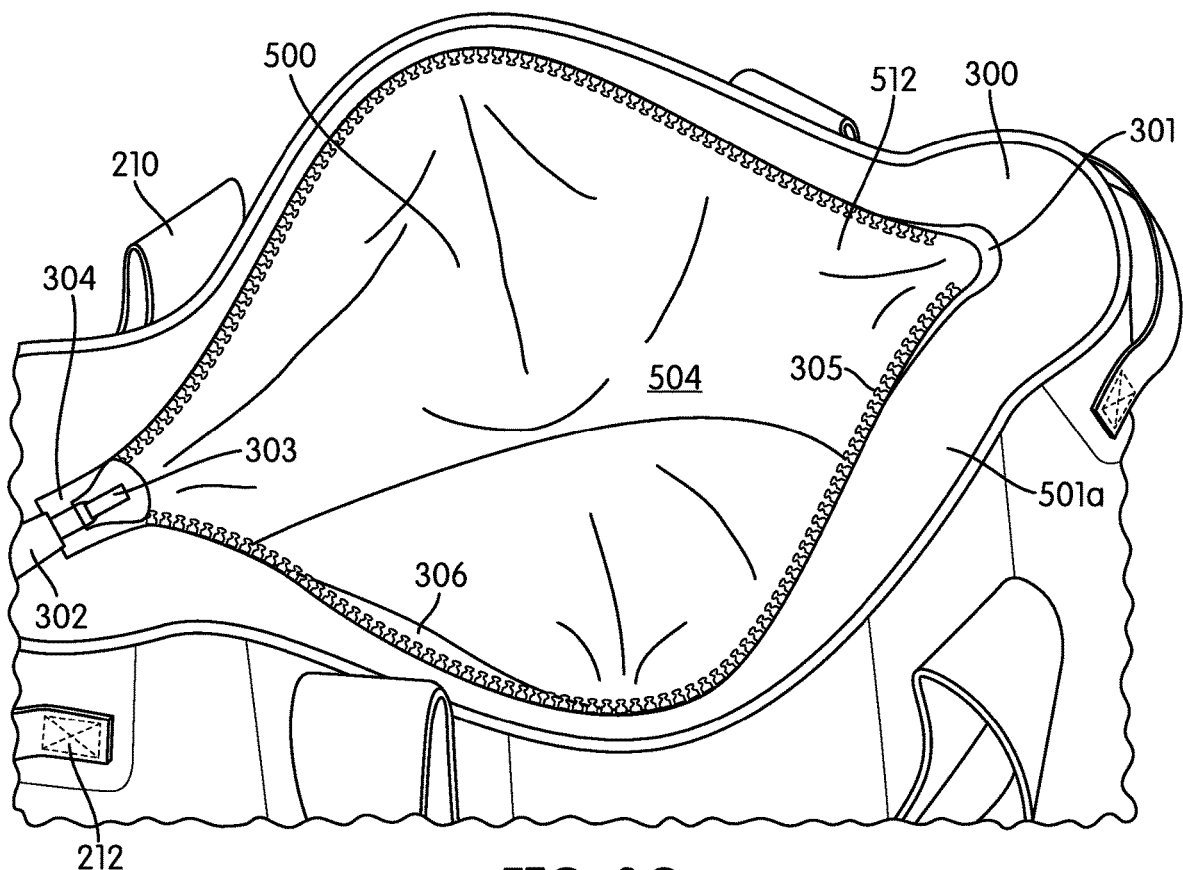
FIG. 3C shows a portion of an alternate top perspective view of the example insulating device of FIG. 1A.

FIGS. 3A-3C depicts top views of the insulating device 10, and depicts the top outer layer or the first outer shell portion 501a and the closure 301. The top outer layer 501a depicted in FIG. 3A can be secured to the closure 301. In one example, the closure 301 can be a waterproof zipper assembly and can be watertight up to 7 psi above atmospheric pressure during testing with compressed air. However, in other examples, the water tightness of the closure 301 can be from 5 psi to 9 psi above atmospheric pressure and in other examples, the water tightness of the closure 301 can be from 2 psi to 14 psi above atmospheric pressure. The waterproof zipper assembly can include a slider body 303 and pull-tab 302. FIG. 3B shows a magnified view of the closure 301 that includes bottom stop 304 and teeth or a chain 305. In one particular example, the waterproof zipper assembly can be constructed with plastic or other non-metallic teeth 305 to prevent injury when retrieving food or beverages from the inner chamber 504.

As shown in FIG. 3C, the closure 301 is open or unzipped and an aperture 512 formed in the outer shell 501 and the inner liner 500 is open and reveals the inner liner 500 and the inner chamber 504. It is contemplated that the closure or seal 301 can include various sealing devices in addition to the depicted waterproof zipper assembly in FIGS. 3A-3C. For example, Velcro, snaps, buckles, zippers, excess material that is folded multiple times to form a seal such as a roll-down seal, seals, metal or plastic clamps and combinations thereof could be used to seal the inner liner 500 and the outer shell 501.

Figure 8A:
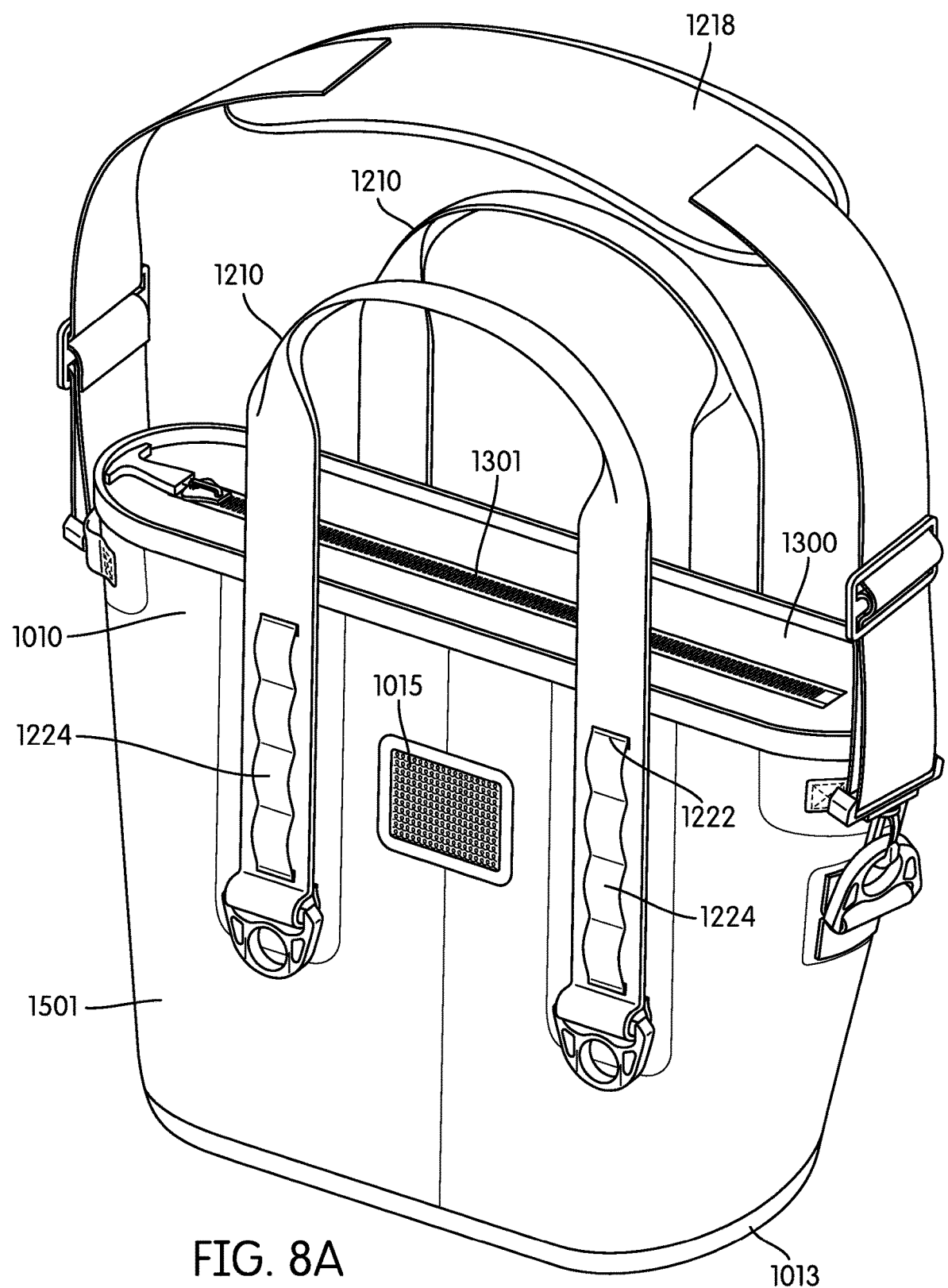
FIGS. 8A and 8B depict perspective views of an alternative example insulating device.
Figure 8B:
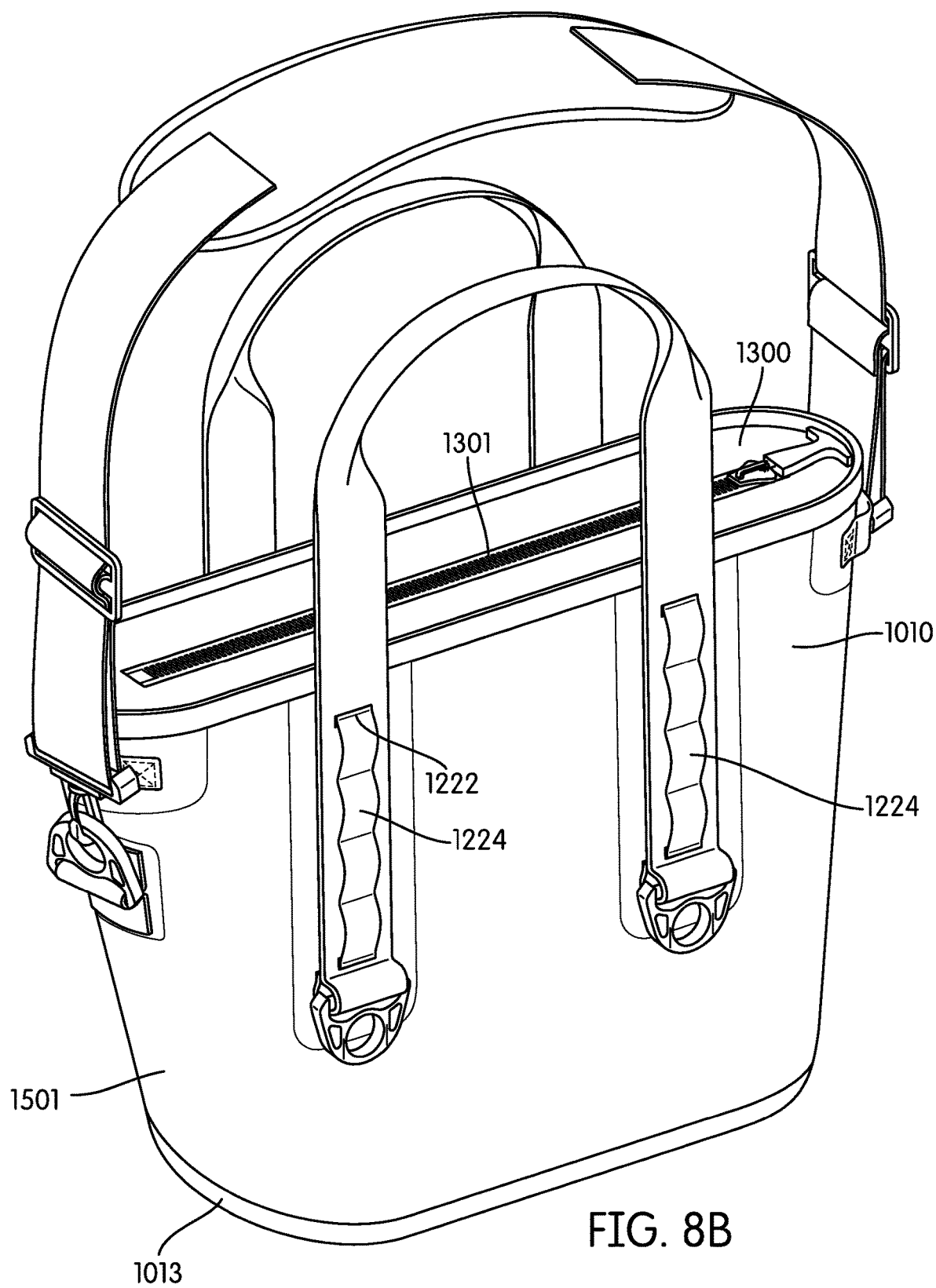

FIG. 8 depicts another exemplary insulating device 1010, which has similar features and functions as the example discussed above in relation to FIGS. 1A-5B in which like reference numerals refer to the same or similar elements. However, in this example, a loop patch 1015 can be provided on the front of the bag. The loop patch 1015 can be configured to receive many types of items or a corresponding group of hooks, which can be placed onto the surface anywhere on various items, such as fishing lures, keys, bottle openers, card holders, tools, other personal items, and the like. The loop patch 1015 can include a logo, company name, personalization, or other customization. The loop patch 1015 can be formed of by needle loops and can have a high cycle life of over 10,000 closures. In addition, the loop patch can be washable and UV resistant to prevent discoloration. The loop patch can be selected based on a desired sheer and peel strength depending on the types of materials that are to be secured to the insulating device 1010.

In the example shown in FIG. 8, additionally, a strip 1013 can be provided along the bottom of the bag, which can provide additional strength and reinforcement to the outer shell 1501, and may enhance the aesthesis of the insulating device 1010.

Figure 6:
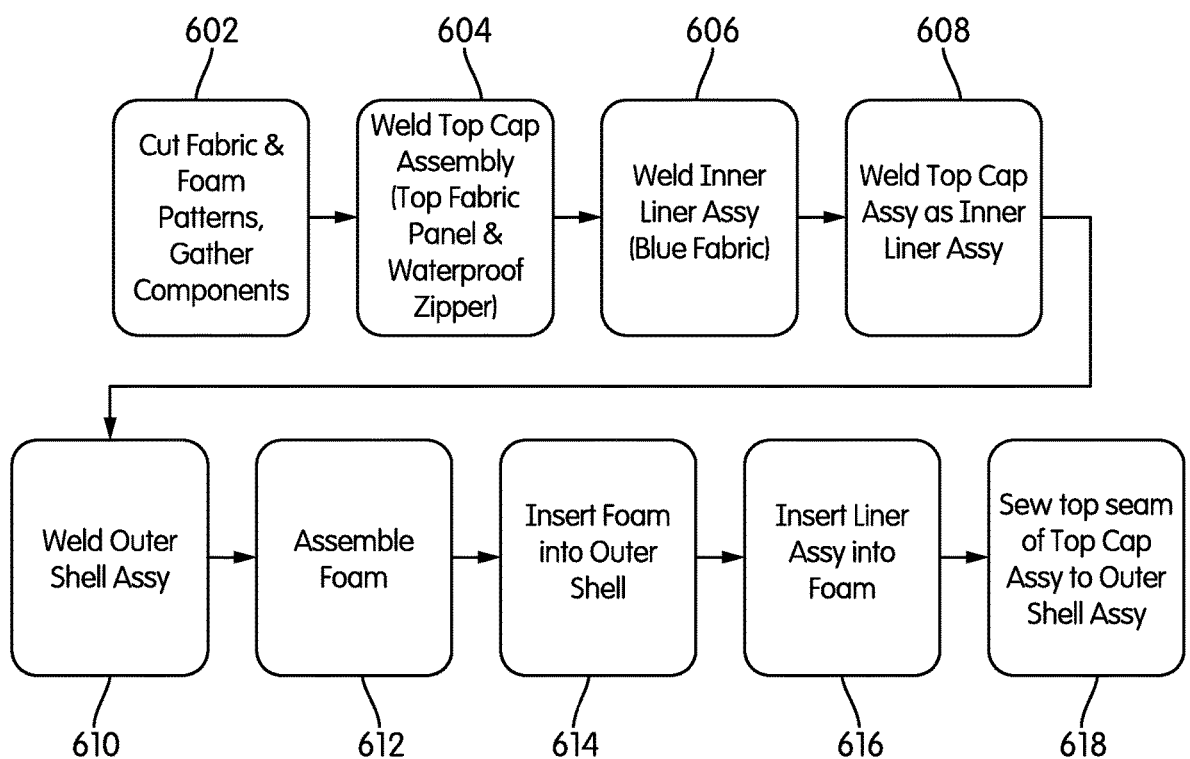
FIG. 6 illustrates an exemplary process flow diagram for forming an insulating device.

Example methods of forming the insulating device 10 will now be described. A general overview of an exemplary assembly process of the insulating device 10 is depicted schematically in FIG. 6. The various steps, however, need not necessarily be performed in the order described. As shown in step 602 first the portions used to form the inner liner 500, the outer shell 501, and the insulating layer 502 can be formed or cut to size. In step 604, a top cap assembly 300 can be assembled to the closure 301. In step 606, the inner liner 500 can be formed, and in step 608, the top cap assembly 300 can be welded to the inner liner 500. In step 610, the outer shell 501 can be formed. In step 612, the insulation layer 502 can be assembled, and in step 616, the insulation layer 502 can be placed into the inner liner. Finally, in step 618, the top cap assembly 300 can be secured to the outer shell 501.

Figure 7A:
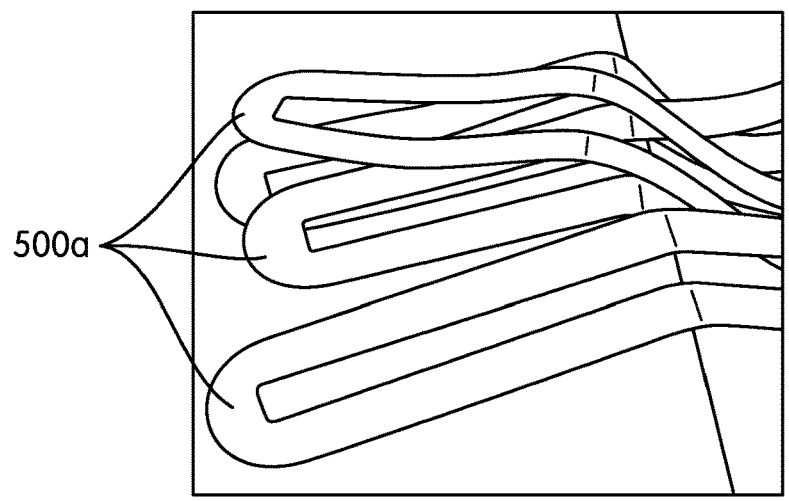
FIGS. 7A-7J illustrate exemplary methods of forming an insulating device.
Figure 7B:
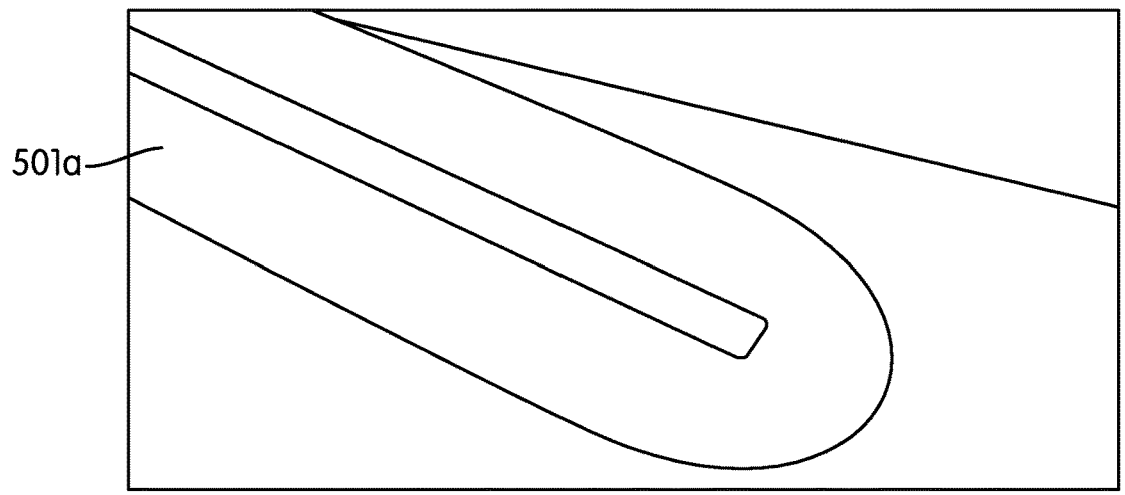
Figure 7C:
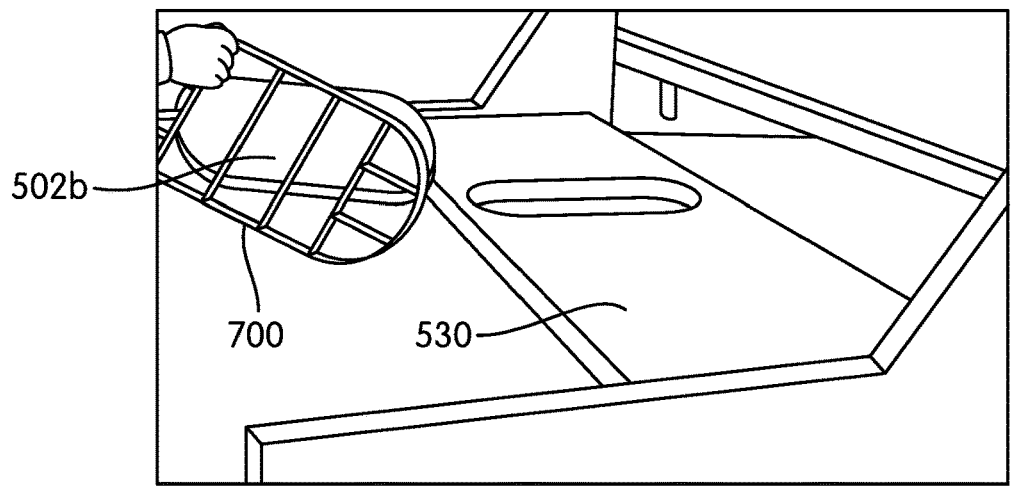

Referring to step 602, as shown in FIGS. 7A and 7B, inner liner top portions or first inner liner portions 500a and outer layer top portion 501a that form the top cap assembly 300 can be formed or cut to size. FIG. 7C shows a second portion or base portion 502b of the insulating layer 502 being cut or formed to size from stock foam. In this example, the base portion 502b is cut from the stock foam 530, by cutting tool 700. In one example, the cutting tool 700 can be formed in the shape of the base portion 502b.

Figure 5B:
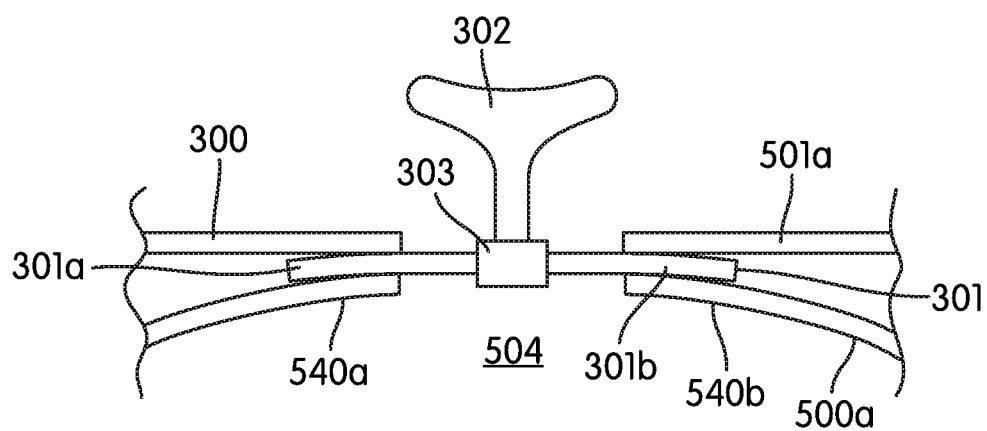
FIG. 5B illustrates another schematic of an enlarged portion of a cross-sectional view of the example insulating device of FIG. 1A.
Figure 7D:
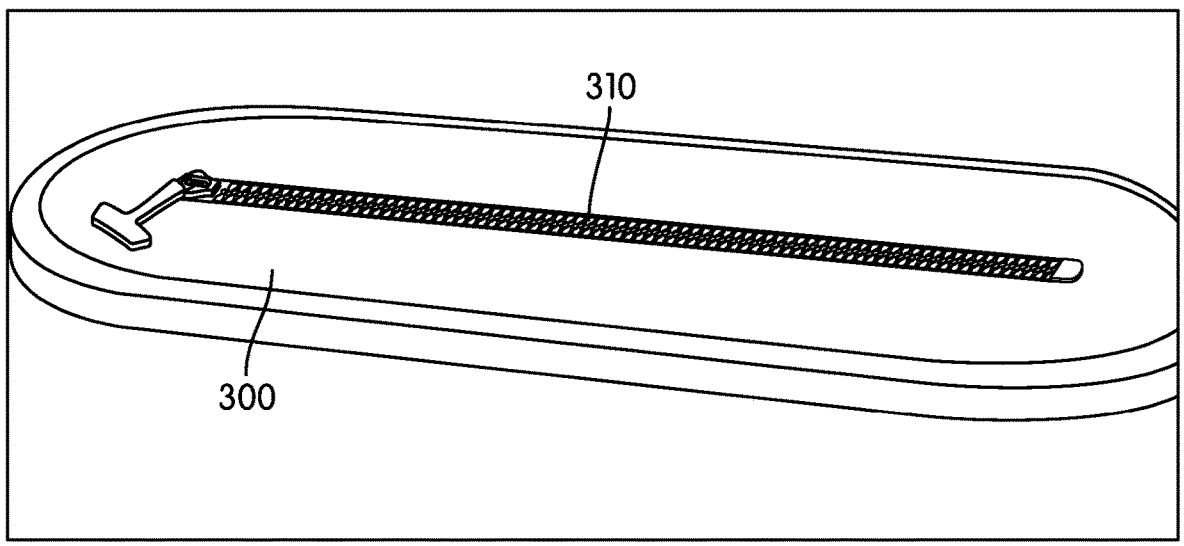
Figure 7E:
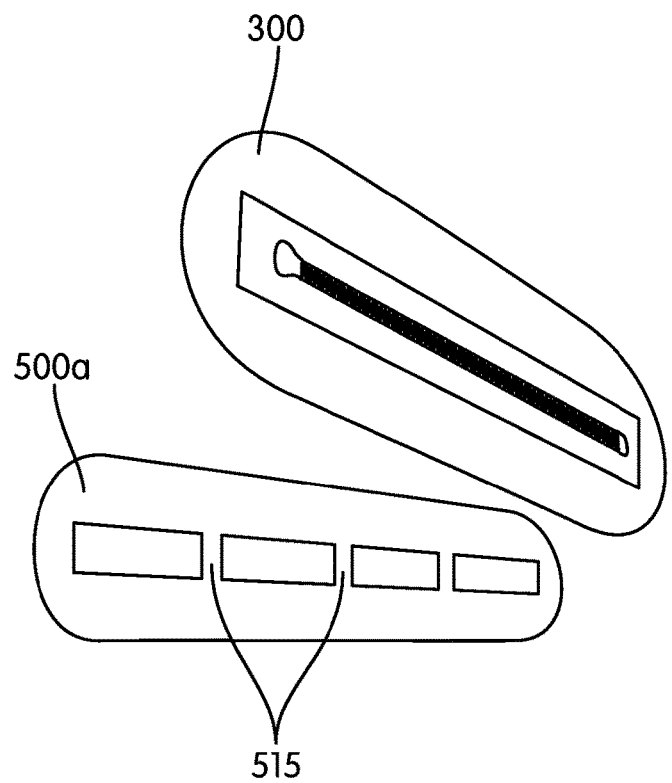

Referring now to step 604 and FIG. 7D, the top outer layer 501a and the top inner liner 500a can be secured to the closure 301 to form the top cap assembly 300, and the top outer layer 501a and the top inner liner 500a can be secured to the closure 301 in a flat, horizontal plane. Referring to FIGS. 5A-5B the top outer layer 501a can be attached by polymer welding or adhesive to closure 301. In particular as shown schematically in FIG. 5B, the closure 301 can be provided with a first flange 301a and a second flange 301b, which can form waterproof zipper tape 306. The top outer layer 501a can be attached directly to the top surfaces of the first flange 301a and the second flange 301b of the closure 301. In one example, the first flange 301a and the second flange 301b, can be RF welded to the underside of the top outer layer 501a. In another example, as shown in FIG. 7E, the top inner liner portion 500a can be provided with tabs

515. Tabs 515 can assist in the assembly process to keep the outer strips of the top inner liner portion 500a in place during assembly and can be removed after the top cap assembly 300 is formed.

In one example, the top inner liner portion 500a can be attached to the structure of the insulating device 10 as shown schematically in FIG. 5B. In particular, the top inner liner portion 500a can be attached to the bottom of the closure 301. For example, as shown in FIG. 5B, and a first end 540a and a second end 540b of the top inner liner portion 500a can be attached to undersides of the first flange 301a and the second flange 301b. The top inner liner portion 500a and the top outer layer 501a can be attached to the closure 301 by polymer welding or adhesive. Polymer welding includes both external and internal methods. External or thermal methods can include hot gas welding, hot wedge welding, hot plate welding, infrared welding and laser welding. Internal methods may include mechanical and electromagnetical welds. Mechanical methods may include spine welding, stir welding, vibration welding, and ultrasonic welding. Electromagnetical methods may include resistance, implant, electrofusion welding, induction welding, dielectric welding, RF (Radio Frequency) welding, and microwave welding. The welding can be conducted in a flat or horizontal plane to maximize the effectiveness of the polymer welding to the construction materials. As a result, a rugged watertight seam can be created that prevents water or fluids from escaping from or into the inner chamber 504.

In a particular example, the polymer welding technique to connect the top inner liner portion 500a to the bottom of the closure 301 can include RF welding. The RF welding technique provides a waterproof seam that prevents water or any other fluid from penetrating the seam at pressure up to 7 psi above atmospheric pressure. The insulating device 10, therefore, can be inverted or submerged in water and leakage is prevented both into and out of the internal chamber 504 formed by inner liner 500. In one example, the insulating device 10 can be submerged under water to a depth of about 16 feet before water leakage occurs. However, it is contemplated that this depth could range from about 11 feet to 21 feet or 5 feet to 32 feet before any leakage occurs.

Figure 7F:
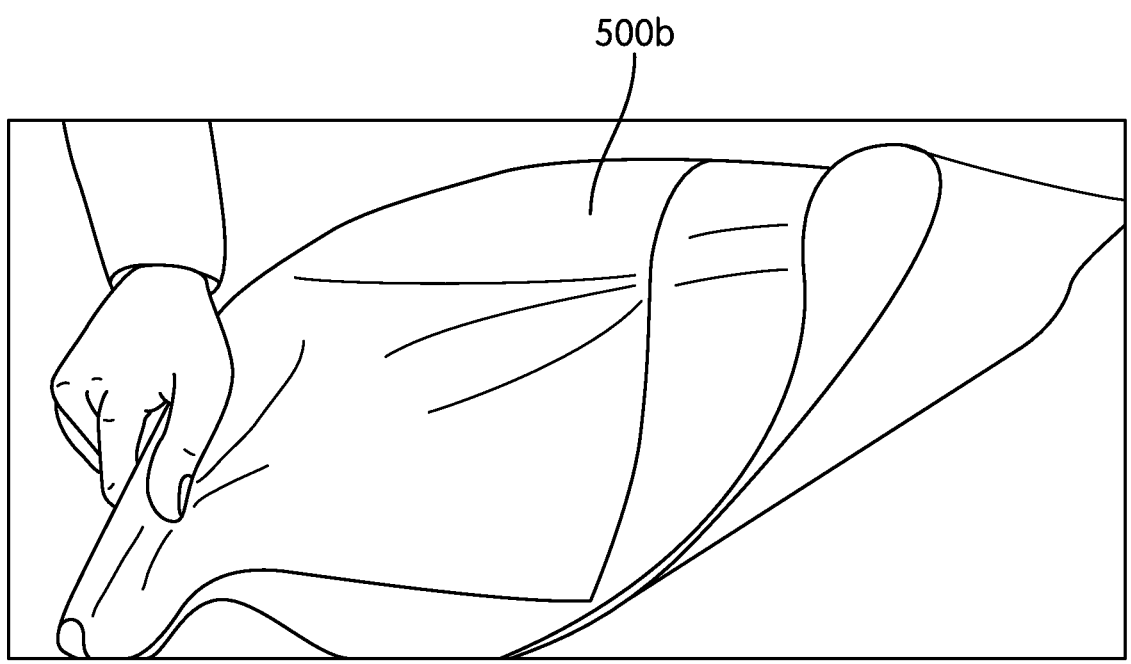

Next referring to step 606 and FIG. 7F, the inner layer mid-portion 500b can be formed by RF welding. As shown in FIG. 7F, the inner layer mid-portion 500b can be formed of a rectangular sheet of material. The inner layer mid-portion 500b can also be secured to the inner layer bottom portion 500c in a subsequent step not shown.

Figure 7G:
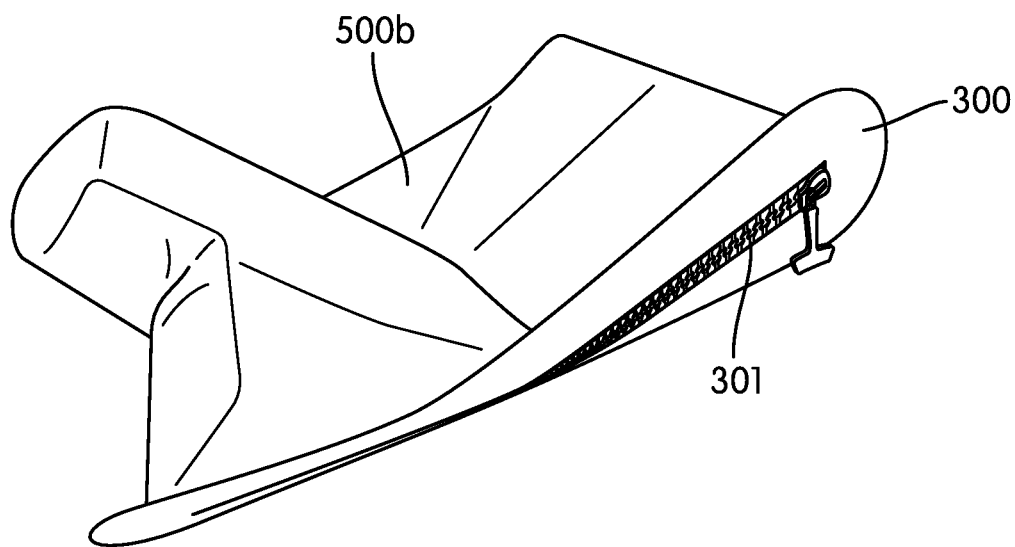
Figure 7H:
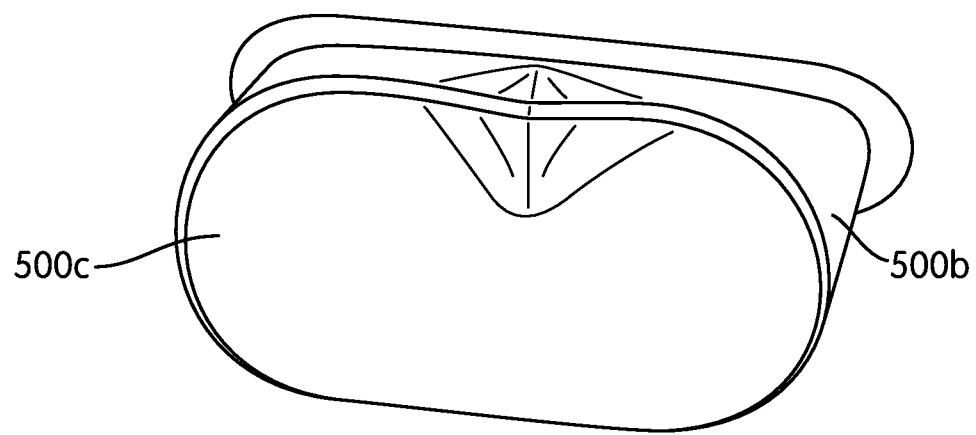

Referring to step 608 and FIGS. 7G and 7H, the inner layer mid portion 500b and the inner layer bottom portion 500c can be secured to the top cap assembly 300 using an RF welding operation.

Referring to step 610, the second shell portion 501b and the bottom outer shell 501c, which supports the base support layer 505, can be RF welded to construct the outer shell 501 for the insulating device 10. In one example, as shown schematically in FIG. 5A, the top outer layer 501a can be sewed to the perimeter of the second shell portion 501b to form the outer shell 501 of the insulating device. A fabric binding can be used to cover the stitched seam edges of the second shell portion 501b and the top outer layer 501a. This assists in closing or joining the outer shell 501 around the insulating layer 502.

Figure 7I:
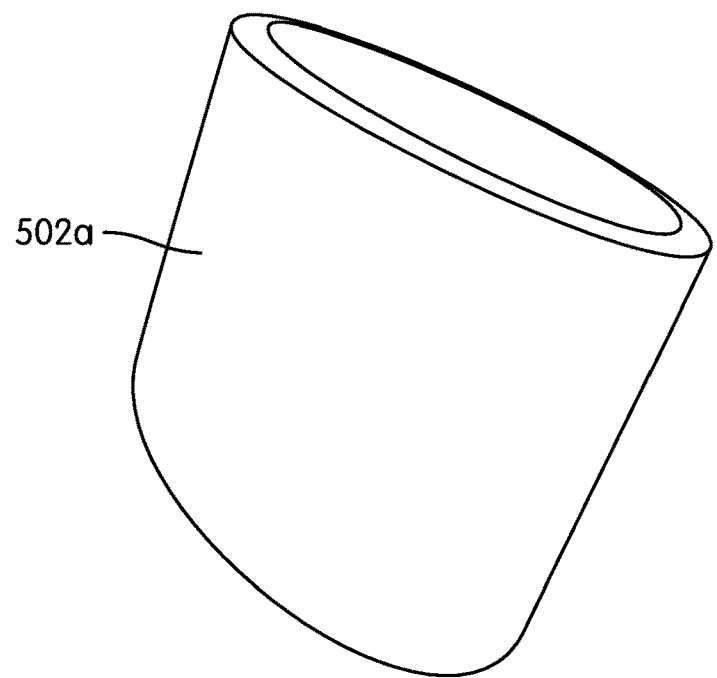
Figure 7J:
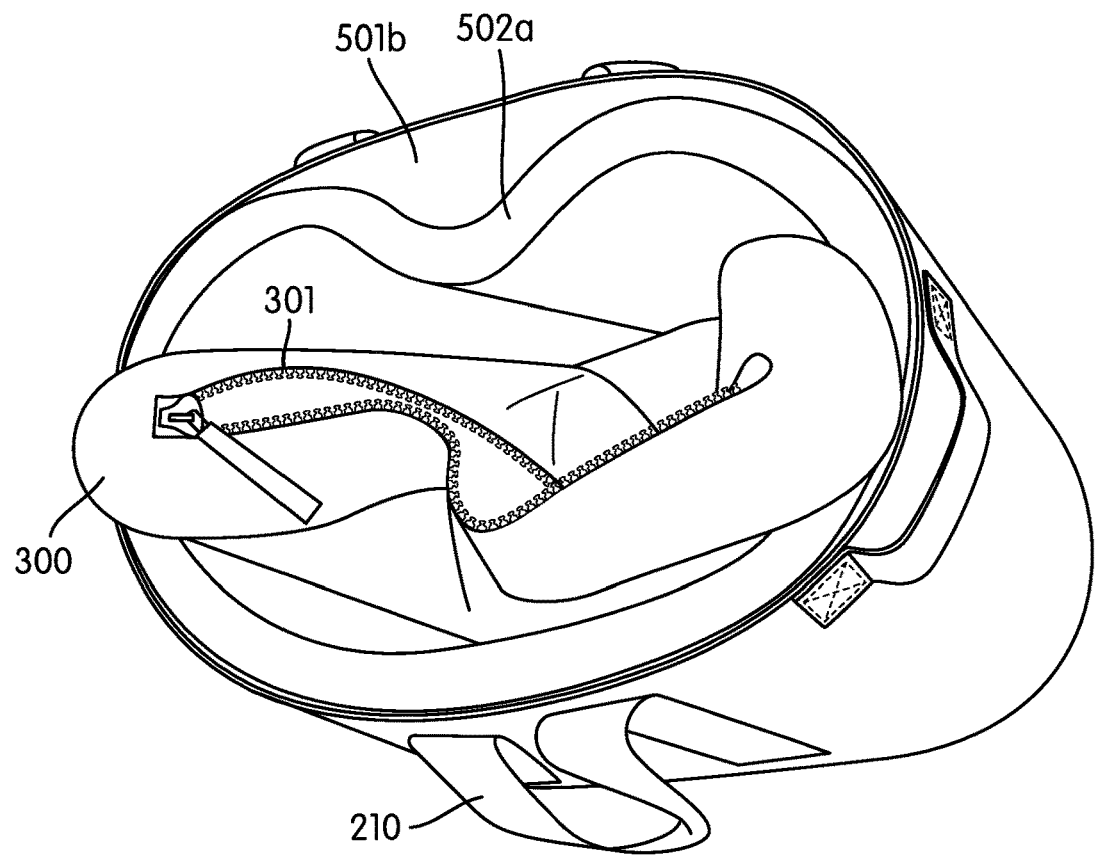

Referring to step 612 and FIG. 7I, the insulating layer 502 can be constructed. In one example the first portion 502a of the insulating layer 502 can be formed into a rectangular shape and can be secured at the smaller sides of the rectangular shape using double sided tape to form the cylindrical shape. The second portion or base portion 502b can be formed into an oval shape that can have a smaller circumference than the circumference of the cylindrical shape of the first portion 502a. The second portion 502b can be secured to the first portion 502a also using a double-sided tape to form the insulating layer 502. In one example, double sided tape can be placed either around the inner perimeter of the first portion 502a cylinder or around the outer perimeter of the base portion 502b, and the base portion 502b can be adhered to the first portion 502a. Other methods of securing the base portion 502b to the first portion 502a to form the insulating layer 502 are contemplated, such adhesives or polymer welding.

Referring to step 614, the assembled insulating layer 502 can be placed into the outer shell 501. In step 616, the formed inner liner 500 and top cap assembly 300 can be placed into the insulating layer 502.

Finally in step 618 the top cap assembly 300 can be sewed to the outer shell 501 to form seams 520 as depicted schematically in FIG. 5A. In this way, neither the inner liner 500 nor the outer shell 501 need to be bound to the insulating layer 502. Also the inner liner 500 is only connected to the closure 301 and the closure 301 holds the inner liner and the outer shell 501 together, which results in a simpler manufacturing process. After sewing the top cap assembly 300 to the outer shell 501, a fabric binding is added to cover the raw edges adjacent the seams 520. Thus, the top seams 520 can be the only primary seams on the insulating device 10 that are created by stitching.

In one particular example, the inner liner 500 and the outer shell 501 can be constructed from double laminated TPU nylon fabric. Nylon fabric can be used as a base material for the inner liner 500 and the outer shell 501 and can be coated with a TPU laminate on each side of the fabric. The TPU nylon fabric used in one particular example is 0.6 millimeters thick, is waterproof, and has an antimicrobial additive that meets all Food and Drug Administration requirements. Alternative materials used to manufacture the inner shell or chamber 504 and outer shell 501 include PVC, TPU coated nylon, coated fabrics, and other weldable and waterproof fabrics.

A closed cell foam can be used to form the insulating layer 502 that is situated in between the inner liner 500 and the outer shell 501. In one example, the insulating layer 502 is 1.0 inches thick. In one example, the insulating layer 502 can be formed of NBR/PVC blend or any other suitable blend. The thermal conductivity of an example insulating layer 502 can be in the range of 0.16-0.32 BTU·in/(hr·sqft·° F.), and the density of the insulating layer 502 can be in the range of 0.9 to 5 lbs/ft$^3$. In one example, the thermal conductivity of the insulating layer 502 can be in the range of 0.25 BTU·in/(hr·sqft·° F.), and the density of the insulating layer 502 can be 3.5 lbs/ft$^3$.

The foam base can be manufactured from an NBR/PVC blend or any other suitable blend. In addition to the base portion 502b of the insulating layer 502, the insulating device 10 may also include an outer base support layer 505 constructed of foam, plastic, metal or other material. In one example, the base portion 502b can be detached from the base support layer. In one example, the base portion 502b is 1.5 inches thick. Additionally as shown in FIG. 5A, the EVA foam base support layer 505 can be 0.2 inches thick. Although the base support layer 505 is laminated to the base outer layer 501c, in an alternative example, the base support layer 505 can be attached to the bottom of the base portion 502b by co-molding, polymer welding, adhesive, or any known methods.

A heat gain test was conducted on the exemplary insulating device 10. The purpose of a heat gain test is to determine how long the insulating device can keep temperature below 50° F. at an ambient of 106° F.±4 with the amount of ice based on its internal capacity.

The procedure is as follows:

1. Turn on the oven and set to 106° F.±4. Allow the oven to stabilize for at least one hour.
2. Turn on the chart recorder. The recorder shall have three J-thermocouples connected to it to chart the following temperatures: (1) Test unit, (2) Oven, and (3) Room ambient.
3. Stabilize the test unit by filling it to half its capacity with ice water, and allowing it to sit for 5 minutes at room temperature (72° F.±2).
4. After 5 minutes, pour out the contents, and immediately connect the J-thermocouple end to the inside bottom center of the unit. The thermocouple wire end must be flush to the inside bottom surface and secured with an adhesive masking tape.
5. Pour the correct amount of ice ensuring the thermocouple wire is not moved. Amount of ice is based on 4 lbs. per cubic feet of the internal capacity of the unit.
6. Close the lid and position the test unit inside the oven.
7. Close the oven making sure the thermocouple wires are functioning.
8. Mark the start of the chart recorder.

Apparatus: 1. Oven. 2. Ice. 3. Chart Recorder. 4. J-Thermocouples (3). Results: 1. Cold Retention Time: Elapsed time from <32° F. to 50° F. in decimal hours. 2. Heat Gain Rate (° F./Hr): (50° F.-32° F.)÷Elapsed Time=18° F.÷Elapsed Time In one test of the example insulating device, the heat gain rate equaled 1.4 deg F./hr assuming 26.5 quarts capacity and used 3.542 lbs of ice for the test.

The ability of the insulating device 10 to withstand interior leaks can also be tested to see how well the insulating device maintains the contents stored in the storage compartment or receptacle 504. In one example test, the insulating device 10 can be filled with a liquid, such as water, and then can be inverted for a predetermined time period to test for any moisture leaks. In this example, the insulating device 10 is filled with a liquid until approximately half of a volume of the receptacle 504 is filled, e.g. 3 gallons of water, and the closure 301 is then closed fully to ensure that the slider body 303 is completely sealed into the horseshoe-shaped portion 308. The entire insulating device 10 is then inverted and held inverted for a time period of 30 minutes. The insulating device 10 is then reviewed for any leaks.

Figure 9:
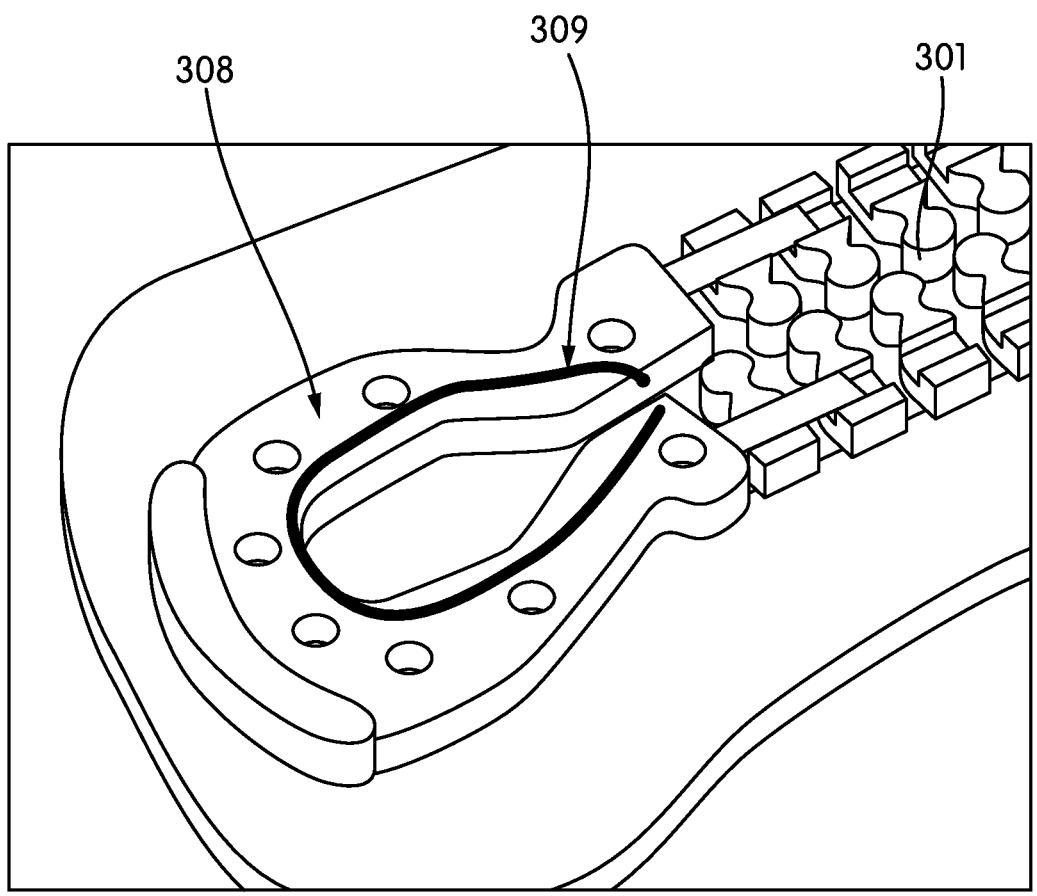
FIG. 9 depicts an example test method for determining if an insulating device maintains the contents therein.

The insulating device 10 can be configured to withstand being held inverted for 30 minutes without any water escaping or leaving the receptacle 504. In alternative examples, the insulating device can be configured to withstand being held inverted for 15 minutes to 120 minutes without any water escaping or leaving the receptacle 504. To perform this test, it may be helpful to lubricate the closure to ensure that the closure is adequately sealed. For example, as shown in FIG. 9, a horseshoe-shaped portion 308 of the closure 301 is provided with lubricant 309.

The strength and durability of the fabric forming the outer shell 501, inner liner 500 and the insulating layer 502 of the insulating device 10 may also be tested. In one example, this test can be devised as a puncture test. In particular, this test can be designed as an ASTM D751-06 Sec. 22-25 screwdriver puncture test. In one example, the insulating device 10 can withstand 35 lbs to 100 lbs of puncture force.

Figure 10:
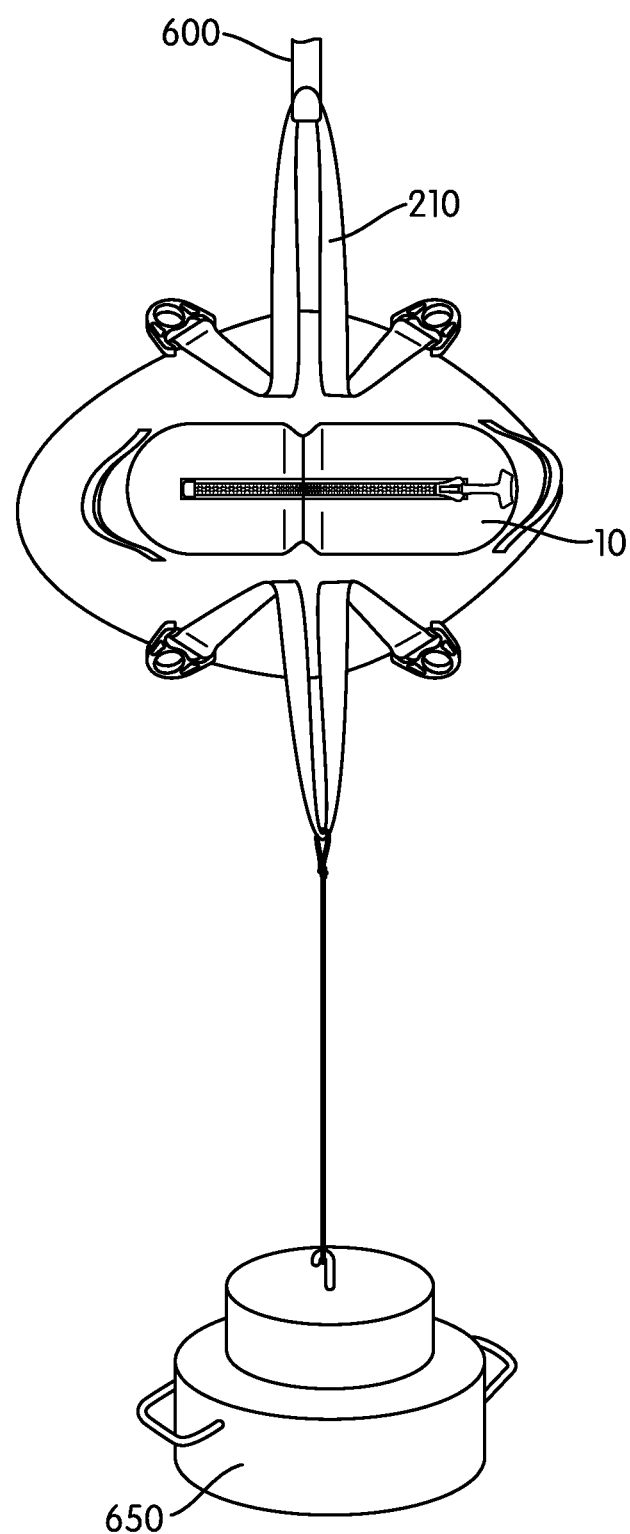
FIG. 10 depicts an example test for determining the strength of an insulating device.

The handle strength and durability of the insulating device 10 can also be tested. One such example test is depicted in FIG. 10. As depicted in FIG. 10, the closure 310 can be fully closed, one of the carry handles 210 can hooked to an overhead crane 600, and the opposite carry handle 210 is hooked to a platform 650, which can hold weight. In one example, the platform 650 can be configured to hold 200 lbs. of weight. During the test, the crane 600 is slowly raised, which suspends the insulating device 10 in a position where the bottom plane of the insulating device 10 is perpendicular with the floor. In one example, the insulating device 10 can be configured to hold 200 lbs. of weight for a minimum of 3 minutes without showing any signs of failure. In alternative examples, the insulating device can be configured to hold 100 lbs. to 300 lbs. of weight for 1 to 10 minutes without showing signs of failure.

An exemplary insulating device may include an outer shell, an inner liner, an insulating layer floating freely in between the outer shell and the inner liner, and a waterproof closure. The top of the shell has first perimeter circumference, and the bottom of the shell has a second perimeter circumference. The first perimeter circumference can be equal to the second perimeter circumference. The closure can be a zipper assembly comprising a plurality of zipper teeth, and the zipper teeth can be formed of plastic or metal. The outer shell can be made of a double laminated TPU nylon fabric. The inner liner can be made of a double laminated TPU nylon fabric. The insulating layer can be formed of a closed cell foam. The insulating layer can be made of a NBR and a PVC blend, and at least a portion of the insulating layer can be constructed with an EVA foam layer. The outer shell further can include at least one of a strap or handle. The outer shell further can include at least one ring for securing the insulating device.

An exemplary insulating device can include an outer shell, an inner liner, a closure adapted to seal at least one of the outer shell or the inner liner, and an insulating layer between the outer shell and the inner liner. The closure can have a first flange and a second flange, and the outer liner can be secured to top surfaces of the first flange and the second flange and the inner liner can be secured to bottom surfaces of the first flange and the second flange. The outer liner and the inner liner can be connected to the closure by a polymer weld. The outer shell can have a first circumference and a second circumference, the first circumference and the second circumference both having an oval shape. The closure can be adapted to be a barrier against fluid. The closure can be a zipper apparatus that is watertight up to 7 psi above atmospheric pressure.

An exemplary method of assembling a insulating device may include forming an inner liner having an inner vessel, forming an outer shell, forming an insulating layer between the inner liner and the outer shell, and securing a closure configured to be a barrier against fluid penetration in and out of the inner vessel wherein the closure is secured in a flat plane and is secured to the outer shell and the inner shell. The outer shell and inner shell may only be connected to the closure and not to the insulating layer between the outer shell and inner liner.

A waterproof polymer weld can be formed between the closure and the inner shell and the closure and the outer shell when the closure, the outer shell, and the inner liner are lying in a horizontal plane. The outer shell and the inner layer can be formed of a TPU nylon material. The closure can have a first flange and a second flange. The outer liner can be secured to top surfaces of the first flange and the second flange and the inner liner can be secured to bottom surfaces of the first flange and the second flange.

The method can also include forming the insulating layer from a rectangular shape, and rolling the rectangular shape into a cylindrical shape. The top of the insulating layer has a first perimeter circumference and the bottom of the insulating layer has a second perimeter circumference. The first perimeter circumference can be equal to the second perimeter circumference.

Another example insulating device can include an outer shell, an inner liner forming a storage compartment, a foam layer floating freely in between the outer and inner liner, the foam layer providing insulation, an opening extending through the outer layer and the inner layer, and a closure adapted to substantially seal the opening. The closure can be substantially waterproof so as to resist liquid from exiting the opening.

The insulating device can also include an upper wall and a base, the upper wall defining an upper wall circumference, an upper wall length and an upper wall width, and the base defining a base circumference, a base length and a base width. The upper wall circumference can be equal to the base circumference and the ratio of the upper wall length to the upper wall width can be greater than the ratio of the base length to the base width. In one example, a heat gain rate of the insulating device can be approximately 1.0-1.5 deg F./hr.

Another example method of forming an insulating device may include forming an inner liner first portion and an outer shell first portion, securing the inner liner first portion and the outer shell first portion to a sealable closure to form a cap assembly, forming an inner liner second portion and securing the inner liner second portion to the inner liner first portion to form an inner liner, forming an outer shell second portion, rolling a rectangular foam portion to form a first cylindrical foam portion and securing a foam base portion to the first cylindrical portion to form a foam assembly, inserting the foam assembly into the outer shell second portion, inserting the inner liner into the foam assembly, and stitching the outer shell first portion to the outer shell second portion. The inner liner first portion and the outer shell first portion can be welded to the closure. The closure can be provided with at least one flange and the flange can be secured to a bottom surface of the outer shell first portion and a top surface of the inner liner first portion. The foam can float between the outer shell second portion and the inner liner second portion.

An example portable insulating device may include an outer liner, an inner liner forming a storage compartment, a foam layer in between the outer and inner liner. The foam layer can be adapted to provide insulation. The example portable insulating device may also include an opening extending through one of the outer layer and the inner layer and a closing means for substantially sealing the opening. The closure can be substantially waterproof.

In one example, a portable cooler may include an aperture on the top of the cooler that is opened and closed by a zipper apparatus which allows access to a chamber within the cooler. The aperture prevents any fluid leakage out of the cooler if the cooler is overturned or in any configuration other than upright. The zipper assembly also prevents any fluid from permeating into the cooler chamber if the cooler is exposed to precipitation, other fluid, or submersed under water.

An example method of assembling a zipper apparatus and aperture configured to be impervious to water or other liquids and fluids can include attachment of a waterproof zipper via material welding to both an outer shell and an inner liner. This method may result in a chamber impervious to water and other liquids when the zipper apparatus on the aperture is sealed.

In one example, an insulating device may include an outer shell, an inner liner forming a storage compartment, a foam layer floating formed in between the outer and inner liner, the foam layer providing insulation, an opening extending through the outer layer and the inner layer, a closure adapted to substantially seal the opening, the closure being substantially waterproof so as to resist liquid from exiting the opening when the insulating device is in any orientation. In one example, the top portion of the outer shell can have a first perimeter circumference in a first configuration. The outer shell may include a bottom portion, the bottom portion of the outer shell can have a second perimeter circumference in a second configuration that is different from the first configuration, and the first perimeter circumference can be equal to the second perimeter circumference. The first configuration and the second configuration can be both oval shaped. In one example, the insulating device may include an upper wall and a base, the upper wall can define an upper wall circumference, an upper wall length and an upper wall width, and the base can define a base circumference, a base length and a base width. The upper wall circumference can be equal to the base circumference and the ratio of the upper wall length to the upper wall width can be greater than the ratio of the base length to the base width. The cold retention time of the insulating device can be approximately 11 to 20 hours. However, in one example the cold retention time can be 11 to 15 hours. In another example the cold retention time can be approximately 12.24 hours. The heat gain rate of the insulating device can be approximately 1 to 1.5 deg F./hr, and, in one particular example, the heat gain rate can be approximately 1.4 deg F./hr. The storage compartment can be configured to maintain a liquid therein while inverted for greater than 15 minutes. In one particular example, the storage compartment can be configured to maintain the liquid for a period of greater than 30 minutes therein when inverted and a half of a volume of the storage compartment is filled with the liquid.

In one example, the insulating layer can be floating freely in between the outer shell and the inner liner. The insulating layer can be formed of closed cell foam, and the insulating layer can be made of a NBR and a PVC blend. In one example least a portion of the insulating layer can be constructed with an EVA foam layer. The closure can be a zipper assembly comprising a plurality of zipper teeth, and the zipper teeth can be formed of plastic.

In one example, the outer shell and the inner liner can be made of a double laminated TPU nylon fabric. The outer shell further can include at least one of a strap or handle. The outer shell can include at least one ring for securing the insulating device. The insulating layer can be configured to maintain an internal temperature of the insulating device below 50 degrees Fahrenheit for 65 to 85 hours. The closure can be formed with a first flange and a second flange and the outer liner can be secured to top surfaces of the first flange and the second flange. The inner liner can be secured to bottom surfaces of the first flange and the second flange. The outer liner and the inner liner can be connected to the closure by a polymer weld. In one example, the closure can be watertight up to 2 to 14 psi above atmospheric pressure. A loop patch may also be provided on the insulating device.

In another example, an insulating device may include an outer shell, an inner liner forming a storage compartment, a foam layer floating in between the outer and inner liner, which provides insulation, an opening extending through the outer layer and the inner layer, a closure adapted to substantially seal the opening. The closure can be substantially waterproof so as to prevent liquid from exiting the opening when the insulating device is inverted for a period of greater than 15 minutes. The heat gain rate of the insulating device can be approximately 1.0 to 1.5 deg F./hr. The insulting device can include at least one handle. The at least one handle can be configured to support 100 lbs. to 300 lbs. of weight for 1 to 10 minutes without showing signs of failure. In one example, the insulating device can be configured to withstand 35 lbs. to 100 lbs. of puncture force.

An example method of forming an insulating device can include forming an inner liner first portion and an outer shell first portion, securing the inner liner first portion and the outer shell first portion to a sealable closure to form a cap assembly, forming an inner liner second portion and securing the inner liner second portion to the inner liner first portion to form an inner liner, forming an outer shell second portion, rolling a rectangular foam portion to form a first cylindrical foam portion and securing a foam base portion to the first cylindrical foam portion to form a foam assembly, inserting the foam assembly into the outer shell second portion, inserting the inner liner into the foam assembly, and securing the outer shell first portion to the outer shell second portion to form the outer shell. The method may also include securing a closure configured to be a barrier against fluid penetration in and out of the inner vessel and forming a waterproof polymer weld between the closure and the inner shell and the closure and the outer shell when the closure, the outer shell, and the inner liner are lying in a flat plane.

In an example, the inner liner first portion and the outer shell first portion can be secured to the closure. The closure can be provided with at least one flange, and the flange can be secured to a bottom surface of the outer shell first portion and a top surface of the inner liner first portion. The foam can freely float between the outer shell second portion and the inner liner second portion. The outer shell and inner shell are only connected to the closure and not to the insulating layer between the outer shell and inner liner. The outer shell can be formed of a TPU nylon material, and the inner liner can be formed from a TPU nylon material. The closure can include a first flange and a second flange. The outer liner can be secured to top surfaces of the first flange and the second flange, and the inner liner can be secured to bottom surfaces of the first flange and the second flange. The top of the insulating layer can have a first perimeter circumference. The bottom of the insulating layer can have a second perimeter circumference. The first perimeter circumference can be equal to the second perimeter circumference.

The present invention is disclosed above and in the accompanying drawings with reference to a variety of examples. The purpose served by the disclosure, however, is to provide examples of the various features and concepts related to the invention, not to limit the scope of the invention. One skilled in the relevant art will recognize that numerous variations and modifications may be made to the examples described above without departing from the scope of the present invention.

What is claimed is:

1. A bag comprising:
   an outer shell defining a frontside, a backside, a bottom, and an inner wall,
      wherein the outer shell is non-rigid, and wherein the outer shell is formed from a one-piece integral structure, wherein the one piece integral structure is joined together to form a seam, and wherein the seam is on one of the backside or the frontside;
   a storage compartment;
   an opening configured to provide access to the storage compartment, wherein the opening further comprises a closing means, and wherein the closing means is a plastic clamp;
   at least two carrying straps,
      wherein a first carrying strap is connected to the frontside, and wherein a second carrying strap is connected to the backside, the first and second carrying straps further comprising,
      a plurality of attachment points,
         wherein a first D-ring is attached to a first lower attachment point,
         wherein a second D-ring is attached to a second lower attachment point, and wherein the first and second lower attachment points are formed from a loop in a material integral with the first and second carrying straps, and wherein the material is nylon webbing,
         wherein a first upper attachment point and a second upper attachment point comprise nylon webbing formed as loops;
      a plurality of reinforcement patches,
         wherein the first and second carrying straps are connected to the plurality of reinforcement patches,
         wherein the reinforcement patches are rectangular, and
         wherein the reinforcement patches are attached to the outer shell; and
   a base,
      wherein the base includes a logo, wherein the logo is molded or embossed directly into the base, and
      wherein the base further comprises a reinforcement strip.

2. The bag of claim 1, wherein the first and second lower attachment points are a different size than the first and second upper attachment points.

3. The bag of claim 1, wherein the first and the second D-rings are plastic.

4. The bag of claim 1, wherein the bottom is substantially oval shaped.

5. The bag of claim 1, wherein the first and second carrying straps are sewn to the plurality of reinforcement patches, and wherein the plurality of reinforcement patches are welded to the outer shell.

6. The bag of claim 1, wherein the opening has a first perimeter circumference, wherein the bottom has a second perimeter circumference, and wherein the first perimeter circumference is about equal to the second perimeter circumference.

7. The bag of claim 1, wherein the outer shell is a material selected from the group consisting of PVC, TPU, TPU coated nylon, double laminated TPU nylon fabric, and coated fabrics.

8. The bag of claim 1, wherein the outer shell is a weldable material.

9. The bag of claim 1, wherein the outer shell is waterproof.

10. A method of forming a bag comprising:
   forming an outer shell defining a frontside, a backside, a bottom, and an inner wall,
      wherein the outer shell is non-rigid, and wherein the outer shell is formed from a one-piece integral structure, wherein the one piece integral structure is fused together to form a seam, and wherein the seam is on the backside;
   forming a storage compartment;

forming an opening configured to provide access to the storage compartment, wherein the opening further comprises a closing means, and wherein the closing means is a plastic clamp;

forming at least two carrying straps,
  wherein a first carrying strap is connected to the frontside, and wherein a second carrying strap is connected to the backside, the forming of the at least two carrying straps further comprising,
    forming a plurality of attachment points,
      wherein a first D-ring is attached to a first lower attachment point,
      wherein a second D-ring is attached to a second lower attachment point, and wherein the first and second lower attachment points are formed from a loop in a material secured to the first and second carrying straps, and wherein the material is nylon webbing,
      wherein a first upper attachment point and a second upper attachment point comprise nylon webbing formed as loops;

forming a plurality of reinforcement patches,
  wherein the first and second carrying straps are connected to the plurality of reinforcement patches,
  wherein the reinforcement patches are substantially rectangular, and
  wherein the reinforcement patches are attached to the outer shell; and forming a base,
  wherein the base includes a logo, wherein the logo is molded or embossed directly into the base, and
  wherein the base further comprises a reinforcement strip.

11. The method of claim 10, wherein the first and second lower attachment points are a different size than the first and second upper attachment points.

12. The method of claim 10, wherein the first and the second D-rings are formed of plastic.

13. The method of claim 10, wherein the bottom is substantially oval shaped.

14. The method of claim 10, wherein the first and second carrying straps are sewn to the plurality of reinforcement patches, and wherein the plurality of reinforcement patches are welded to the outer shell.

15. The method of claim 10, wherein the opening is formed with a first perimeter circumference, wherein the bottom is formed with a second perimeter circumference, and wherein the first perimeter circumference is about equal to the second perimeter circumference.

16. The method of claim 10, wherein the outer shell is constructed from a material selected from the group consisting of PVC, TPU, TPU coated nylon, double laminated TPU nylon fabric, and coated fabrics.

17. The method of claim 10, wherein the outer shell is formed of a weldable material.

18. The method of claim 10, wherein the outer shell is waterproof.

* * * * *

UNITED STATES PATENT AND TRADEMARK OFFICE
CERTIFICATE OF CORRECTION

PATENT NO. : 10,577,167 B2
APPLICATION NO. : 16/153011
DATED : March 3, 2020
INVENTOR(S) : Seiders et al.

Page 1 of 1

It is certified that error appears in the above-identified patent and that said Letters Patent is hereby corrected as shown below:

On the Title Page

Column 1, Related U.S. Application Data, Line 1:
Delete "(60)" and Insert --(63)--

Column 2, Other Publications, Line 1:
Delete "Actiont" and Insert --Action--

On Page 7, Column 2, Other Publications, Line 28:
Delete "Insultated" and Insert --Insulated--

On Page 7, Column 2, Other Publications, Line 60:
Delete "Actiont" and Insert --Action--

Signed and Sealed this
Twenty-sixth Day of May, 2020

Andrei Iancu
*Director of the United States Patent and Trademark Office*